(12) United States Patent
Tanaka

(10) Patent No.: US 9,009,026 B2
(45) Date of Patent: Apr. 14, 2015

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(75) Inventor: Eiichi Tanaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 630 days.

(21) Appl. No.: 13/345,204

(22) Filed: Jan. 6, 2012

(65) Prior Publication Data

US 2013/0080153 A1 Mar. 28, 2013

(30) Foreign Application Priority Data

Sep. 26, 2011 (JP) ................. 2011-208369

(51) Int. Cl.
*G06F 17/27* (2006.01)
*G06F 17/22* (2006.01)

(52) U.S. Cl.
CPC .......... *G06F 17/273* (2013.01); *G06F 17/2223* (2013.01)

(58) Field of Classification Search
CPC ..... G06F 17/20; G06F 17/2223; G06F 17/27; G06F 17/2705; G06F 17/273; G06F 17/1735; G06F 17/2755; G06F 17/277; G06F 17/2775; G06F 17/28; G06F 17/2863

USPC ............................................. 704/9
See application file for complete search history.

(56) References Cited

U.S. PATENT DOCUMENTS

| 5,875,443 | A  | * | 2/1999 | Nielsen ............................. 1/1 |
| 8,726,148 | B1 | * | 5/2014 | Battilana ..................... 715/234 |
| 2002/0194229 | A1 | * | 12/2002 | Decime et al. ............... 707/533 |
| 2007/0265832 | A1 | * | 11/2007 | Bauman et al. ................ 704/10 |
| 2009/0089665 | A1 | * | 4/2009 | White et al. ................. 715/257 |

FOREIGN PATENT DOCUMENTS

| JP | A-62-285189 | 12/1987 |
| JP | A-1-281561 | 11/1989 |
| JP | A-2-118785 | 5/1990 |
| JP | A-5-128296 | 5/1993 |
| JP | A-2010-257021 | 11/2010 |

* cited by examiner

Primary Examiner — Eric Yen
(74) Attorney, Agent, or Firm — Oliff PLC

(57) ABSTRACT

An information processing apparatus includes a receiving unit that receives character sequences, a sorting unit that sorts the character sequences received by the receiving unit into known words and unknown words, and a detecting unit that detects character sequences sorted as unknown words by the sorting unit as incorrect words and detects a third character sequence between a first character sequence and a second character sequence, which have been sorted as unknown words by the sorting unit, as incorrect words when the third character sequence includes words sorted as known words by the sorting unit and the number of the known words is less than or equal to or less than a predetermined number.

18 Claims, 25 Drawing Sheets

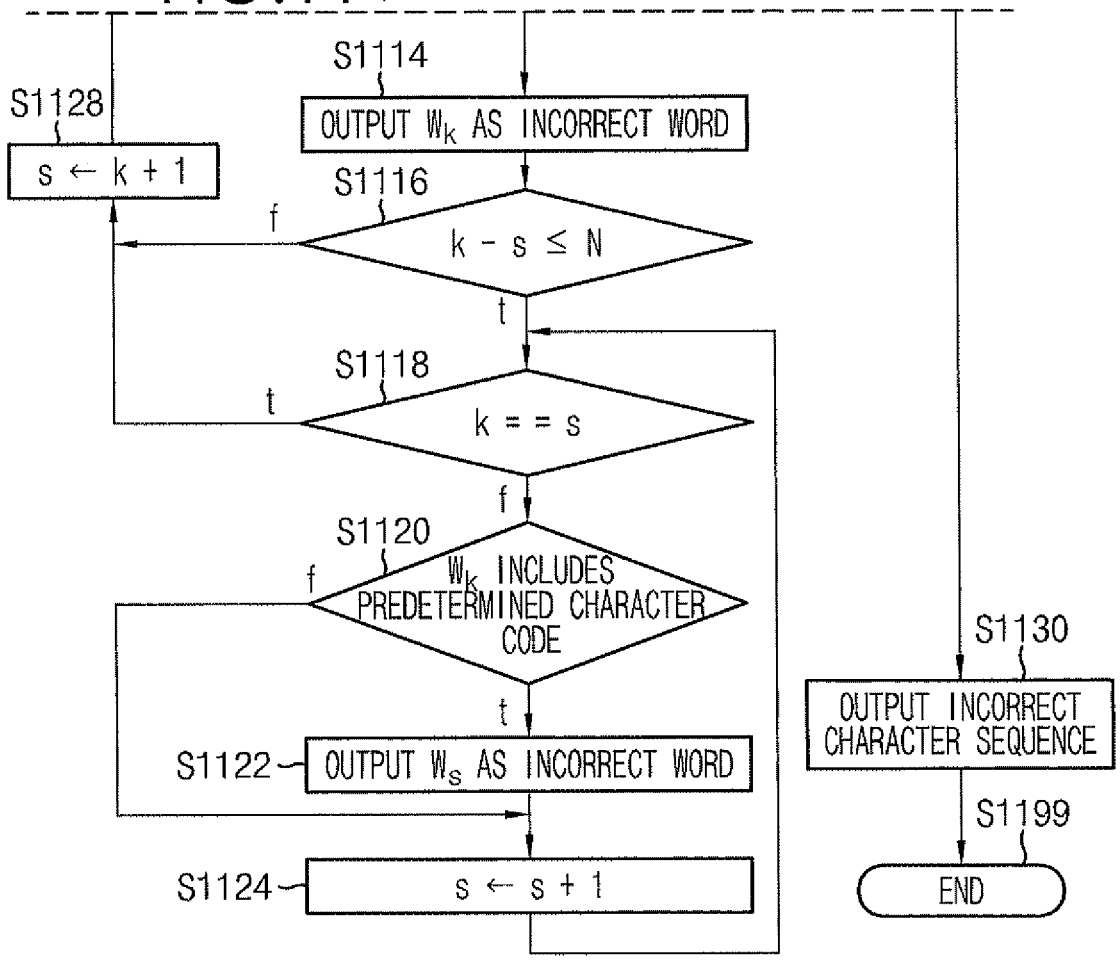

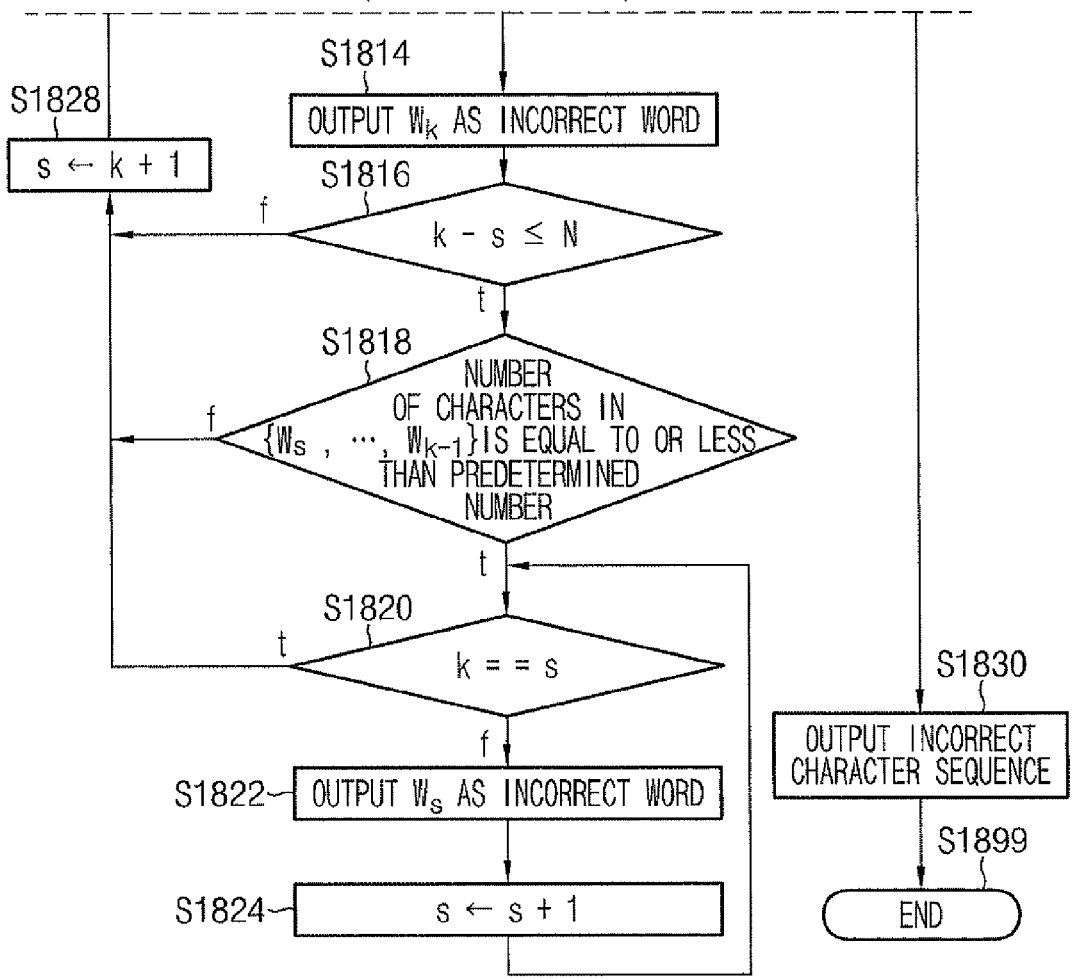

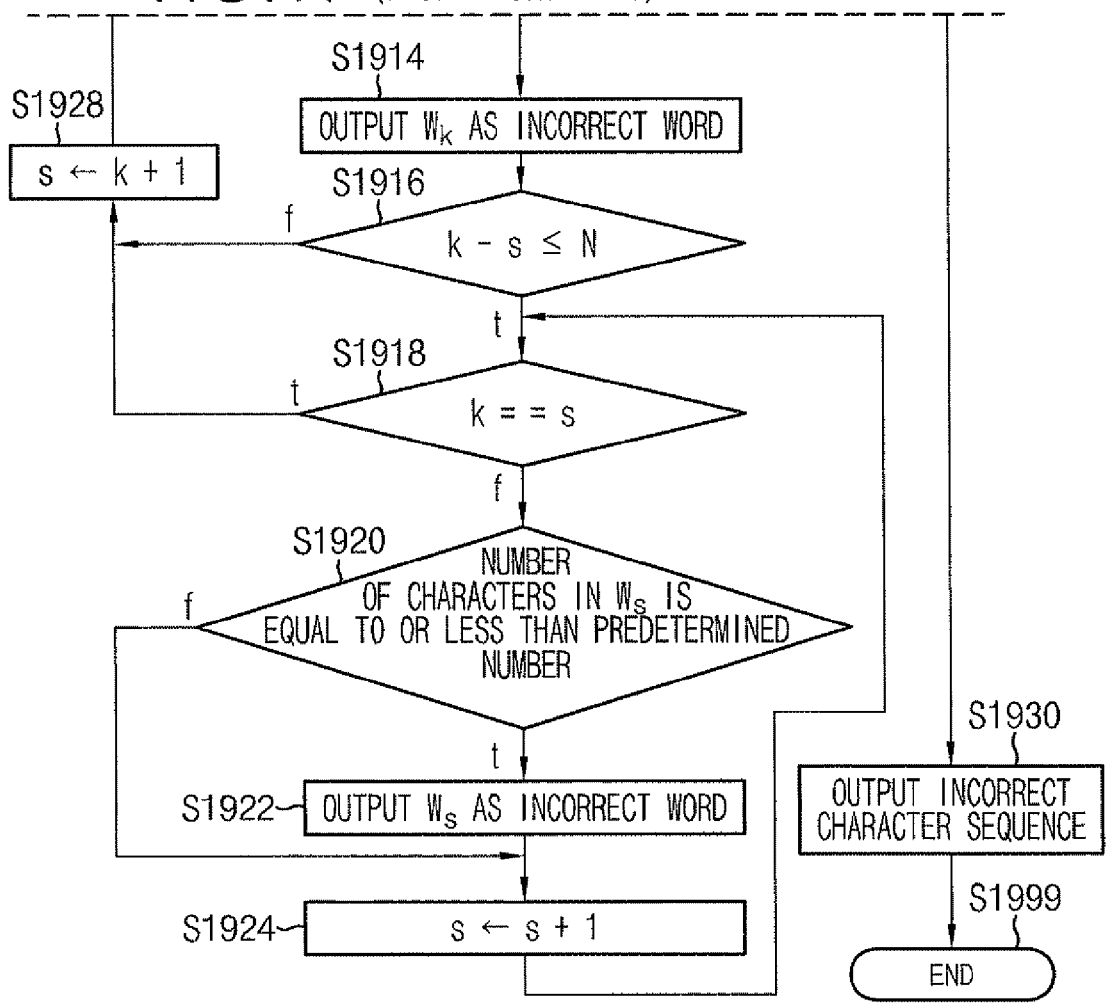
FIG.19 (FIG. 19 Continued)

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2011-208369 filed Sep. 26, 2011.

BACKGROUND

Technical Field

The present invention relates to an information processing apparatus, a non-transitory computer readable medium storing an information processing program, and an information processing method.

SUMMARY

According to an aspect of the invention, there is provided an information processing apparatus including: a receiving unit that receives character sequences; a sorting unit that sorts the character sequences received by the receiving unit into known words and unknown words; and a detecting unit that detects character sequences sorted as unknown words by the sorting unit as incorrect words and detects a third character sequence between a first character sequence and a second character sequence, which have been sorted as unknown words by the sorting unit, as incorrect words when the third character sequence includes words sorted as known words by the sorting unit and the number of the known words is less than or equal to or less than a predetermined number.

BRIEF DESCRIPTION OF THE DRAWINGS

Exemplary embodiments of the present invention will be described in detail based on the following figures, wherein.

DETAILED DESCRIPTION

First, description will be given of an outline of the exemplary embodiments described later. The exemplary embodiments belong to a technique for detecting an error included in a text as a processing target. Particularly, the exemplary embodiments belong to a technique based on an unknown word in word analysis.

Now, it is assumed that a certain text is subjected to conversion which may cause an error. The conversion which may cause an error includes human typing (manual input using a keyboard, a touch panel, or the like), character recognition (a technique for converting a character as an image into a character as a text, whose recognition rate is not always 100%), or the like.

Typically, error detection for a character sequence based on words requires word analysis. The word analysis is processing of outputting a series of words (or separating points in the region) in a character sequence which is a series of unspecified number of characters. Among techniques of detecting an error in a character sequence based on words, there is a technique of detecting an error while an unknown word is prohibited based on a predetermined prohibition rule. Specifically, in the detection of an error in a character sequence while prohibiting an unknown word, a region for which the word analysis cannot be performed (namely, an unknown word) since the word is not registered in a word dictionary or the word is not based on a grammar rule is detected as a region including an error. Specifically, processing of verifying whether or not a word is registered in a dictionary (a word list including information such as word classes and the like), morpheme analysis, and the like correspond thereto.

Figure 2:
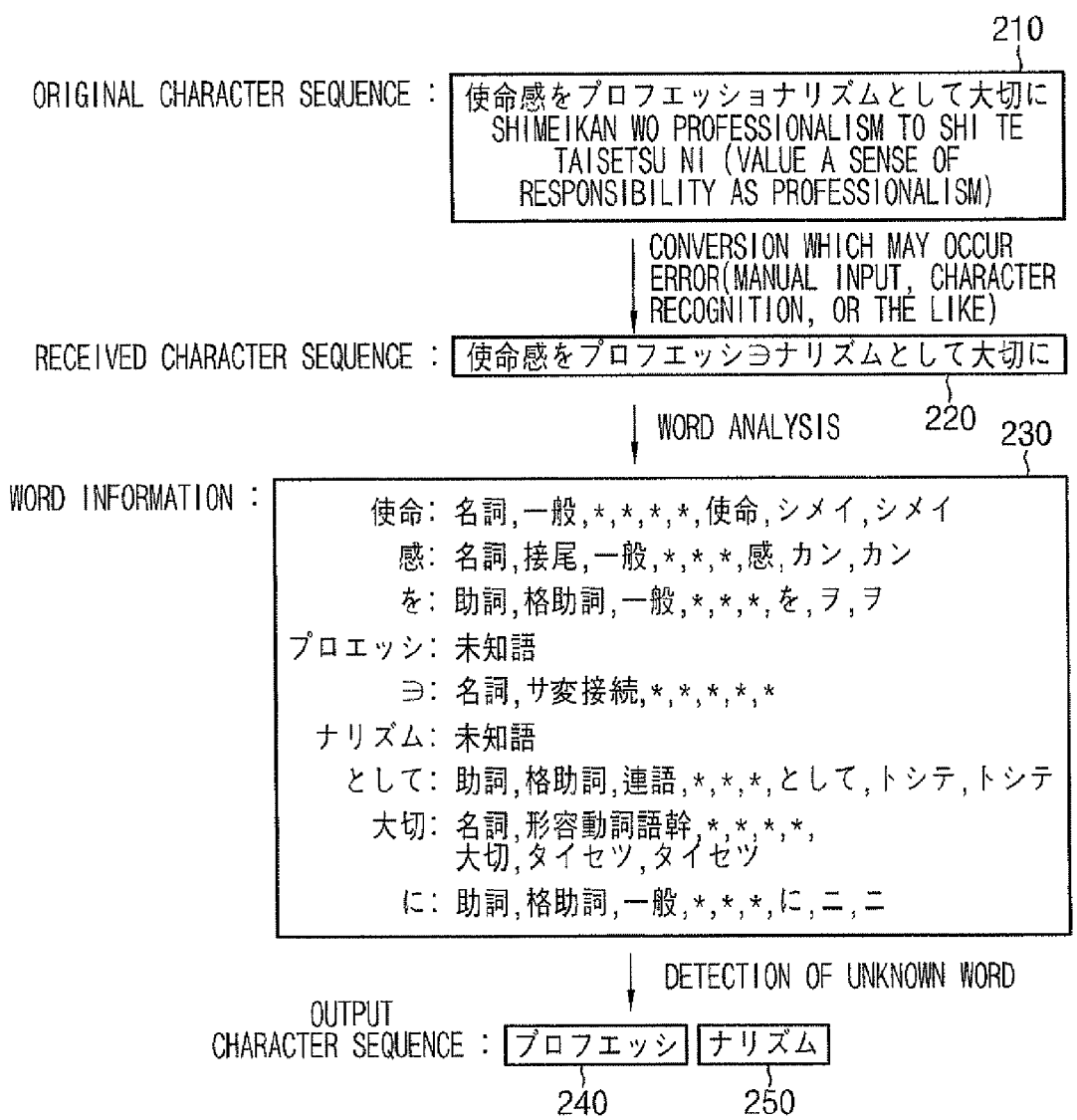
FIG. 2 is an explanatory diagram showing an example of processing of detecting an unknown word.

FIG. 2 is an explanatory diagram showing an example of processing of detecting an unknown word. The conversion which may occur an error is performed on an original character sequence 210 "使命感をプロフェッショナリズムと

して大切に shimeikan wo professionalism to shi to taisetsu ni (value a sense of responsibility as professionalism)" which is an original character sequence (a character sequence with no error), and a received character sequence 220 "使命感をプロフェッショナリズム として大切に" is obtained. There are two errors including "エ" ("エ" in the original character sequence 210) and "ョ" ("ヨ" in the original character sequence 210).

On the received character sequence 220 including such errors, word analysis processing and processing of detecting errors in a character sequence while prohibiting unknown words are performed. Then, word information 230 as shown in an example of FIG. 2 is obtained. In this example, word classes such as a noun, a particle, and the like are added to known words (words registered as the words in the dictionary) as a result of the processing, and the phrase of "unknown word" is added to the words other than the known words instead of the word classes. Specifically, in relation to "プロフエッショ リ ズム" is analyzed as "プロフエッシ", "ョ", and "ナリズム", and "プロフエッシ" (a character sequence 240) and "ナリズム" (a character sequence 250) are regarded as unknown words while "ョ" is regarded as a word other than an unknown word.

When only an unknown word is detected as a region including an error, the error of "エ" ("エ" in the original character sequence 210) is correctly detected as the character sequence 240 while "ョ" ("ヨ" in the original character sequence 210) is not detected since "ョ" is not an unknown word in the example of FIG. 2. That is, a region including errors may be divided into an unknown word and a word other than an unknown word, and a character sequence including an error may not be included in the unknown word at this time in some cases.

According to an exemplary embodiment described later, unknown words are detected as regions including errors. In addition, a word interposed between unknown words is detected as a region including an error. As described above, a region including errors may be divided into an unknown word and a word other than an unknown word, and a character sequence including an error may not be included in the unknown word at this time in some cases.

However, an unknown word appears in the vicinity of the error in some cases even if the error is not included in the unknown word under such circumstances. According to the exemplary embodiment, a word interposed between unknown words is detected as a region including an error.

Figure 3:
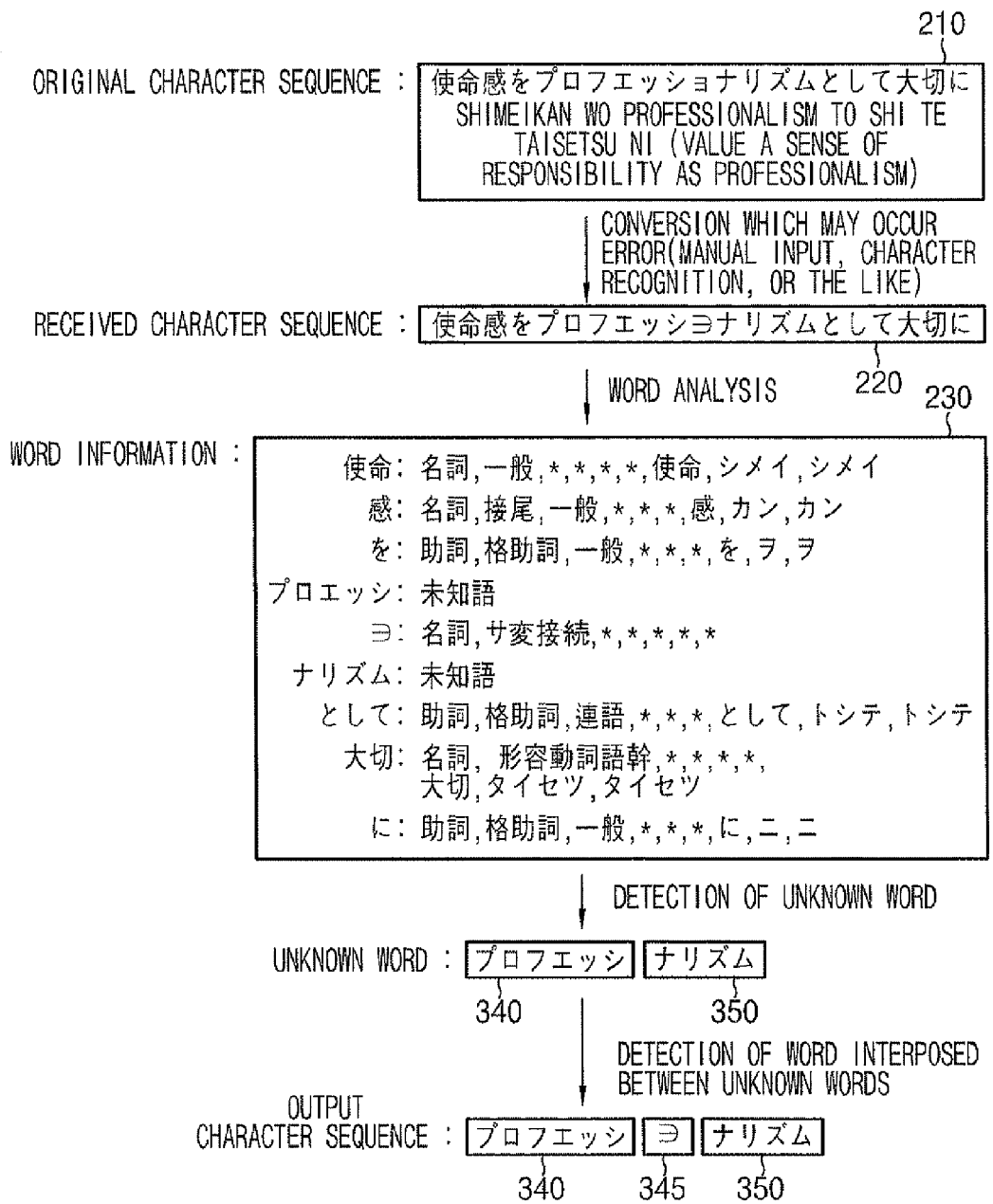
FIG. 3 is an explanatory diagram showing an example of processing of detecting a word interposed between unknown words.

This state will be shown in an example of FIG. 3. FIG. 3 is an explanatory diagram showing an example of processing of detecting a word interposed between unknown words. From "プロフエッシ" (a character sequence 340) and "ナリズム" (a character sequence 350) which are unknown words, "ョ" (a character sequence 345) which includes an error but is not an unknown word is detected as an incorrect word.

Hereinafter, description will be given of various exemplary embodiments for realizing the present invention with reference to the drawings.

Figure 1:
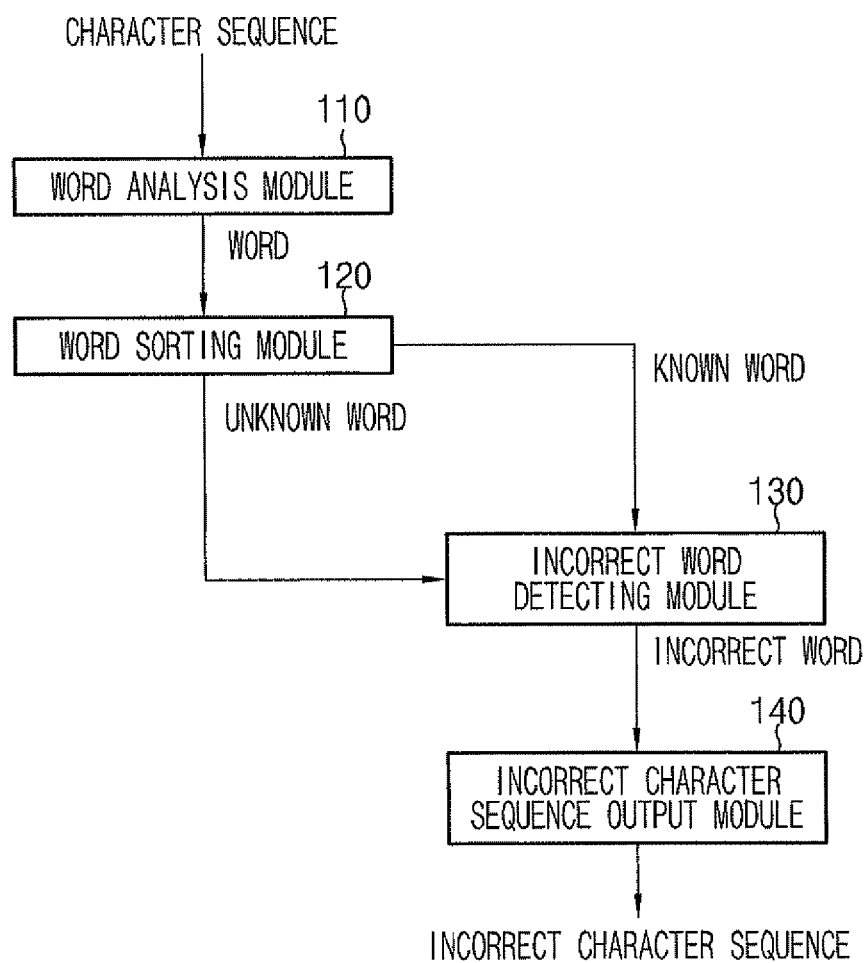
FIG. 1 is a conceptual module configuration diagram of a configuration example according to a first exemplary embodiment.

FIG. 1 is a conceptual module configuration diagram of a configuration example according to a first exemplary embodiment.

Typically, a module is a component such as software (a computer program), hardware, or the like which can be logically separated. Therefore, the module in the exemplary embodiment indicates not only a module in computer program but a module in a hardware configuration. For this reason, the exemplary embodiment also includes a description of a computer program (a program that causes a computer to execute each procedure, a program that causes a computer to function as each component, a program that causes a computer to realize each function), a system, and a method which are made to function as such a module. Although "store", "made to store", and other equivalent expressions are used for convenience of description, such expressions mean that a computer program makes a storage device store something or that a computer program controls a storage device to store something, when the exemplary embodiment is related to a computer program. Although a module may have a one-to-one correspondence relationship for implementations in implementation, one module may be configured by one program, multiple modules may be configured by one program, or one module may be configured by multiple programs in the opposite manner. In addition, multiple modules may be executed by one computer, or one module may be executed by multiple computers in a distributed or parallel environment. In addition, one module may include another module. Hereinafter, an expression "connection" is used for a case of logical connection (exchanging of data, instructions, reference relationships between data, and the like) as well as physical connection. An expression "predetermined" means that determination is made before target processing and is used such that the expression includes the meaning that the determination is made in accordance with a condition and a state at that time or in accordance with a condition and a state until then even after the start of the processing of the exemplary embodiment as long as the determination is made before the target processing, as well as the meaning that the determination is made before the processing of the exemplary embodiment.

In addition, a system or an apparatus includes the case in which a system or an apparatus is implemented by one computer, hardware, an apparatus, or the like as well as a configuration in which multiple computers, hardware, apparatuses, and the like are connected via communication such as a network (including communication connection of one-to-one correspondence relationship). The expressions "apparatus" and "system" are used as terms with the same meaning. It is matter of course that the "system" does not include merely a societal "mechanism" ("social system"), which is an artificial rule.

The target information is read from a storage device for every processing by each module or for every processing when multiple kinds of processing are performed in a module, and a processing result is written in the storage device after the reading processing. Accordingly, description relating to reading from the storage device before the processing and the writing in the storage device after the processing may be omitted in some cases. In addition, the storage device here may include a hard disk, a RAM (Random Access Memory), an external storage medium, a storage apparatus via a communication line, a register in a CPU (Central Processing Unit), and the like.

An information processing apparatus according to a first exemplary embodiment detects a region, which included an error, in a target character sequence, and includes a word analysis module 110, a word sorting module 120, an incorrect word detecting module 130, and an incorrect character sequence output module 140 as shown in an example of FIG. 1.

The word analysis module 110 is connected to the word sorting module 120, receives a character sequence, extracts words in the character sequence and passes the extracted words to the word sorting module 120. In addition, the words as an analysis result by the word analysis module 110 include character sequences as known words and character sequences as unknown words.

The word sorting module 120 is connected to the word analysis module 110 and the incorrect word detecting module 130, receives the words from the word analysis module 110, sorts the words into known words and unknown words, and passes the sorted known words and the unknown words to the incorrect word detecting module 130. In addition, the word analysis module 110 and the word sorting module 120 perform the aforementioned "word analysis processing and processing of sorting known words and unknown words".

The incorrect word detecting module 130 is connected to the word sorting module 120 and the incorrect character sequence output module 140, and the incorrect word detecting module 130 detects as incorrect words in character sequences which have been sorted as unknown words by the word sorting module 120 and detects a third character sequence between a first character sequence and a second character sequence, which have been sorted as unknown words by the word sorting module 120, as incorrect words when the third character sequence includes words sorted as known words by the word sorting module 120 and the number of the known words is less than or equal to or less than a predetermined number. That is, the incorrect word detecting module 130 receives known words and unknown words from the word sorting module 120, detects incorrect words from the known words and the unknown words, and outputs the detected incorrect words to the incorrect character sequence output module 140.

The incorrect character sequence output module 140 is connected to the incorrect word detecting module 130, receives the incorrect words from the incorrect word detecting module 130, creates incorrect character sequences from the incorrect words, and outputs the created incorrect character sequences. Specifically, the incorrect character sequence output module 140 arranges the incorrect words detected by the incorrect word detecting module 130 in the order of the character sequences received by the word analysis module 110, combines adjacent words, and creates character sequences including errors.

Figure 4:
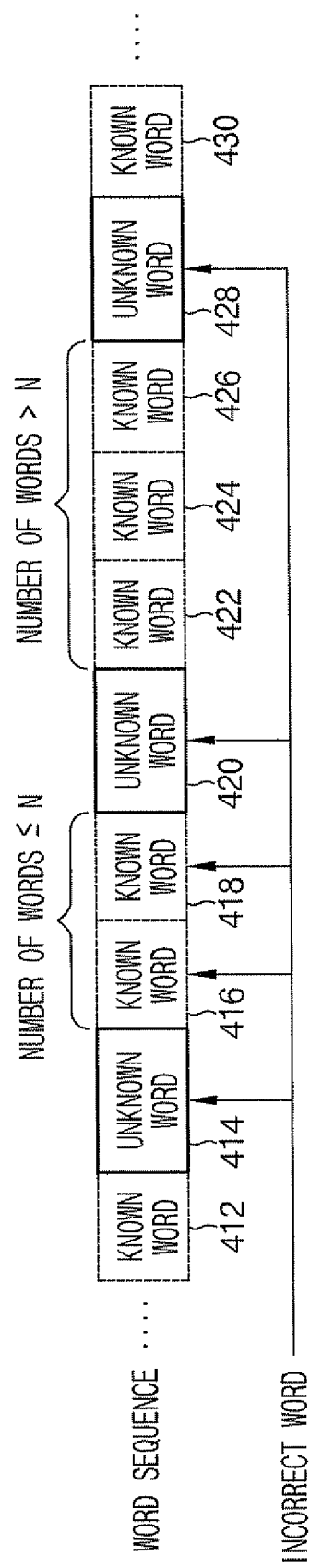
FIG. 4 is an explanatory diagram of an example of processing of detecting an incorrect word.

FIG. 4 is an explanatory diagram showing an example of processing of detecting incorrect words.

The word analysis module 110 performs word analysis on the character sequences received by the word analysis module 110 to obtain word sequences. The word sequences are sorted into unknown words and words other than unknown words (namely, known words). When the number of known words between a certain unknown word and an unknown word which appears next is less than or equal to or less than a predetermined integer N, the incorrect word detecting module 130 outputs the known words as incorrect words. In addition, incorrect word detecting module 130 also outputs the unknown words as incorrect words.

In an example of FIG. 4, the incorrect word detecting module 130 sets the integer N to two and regards known words as incorrect words when the number of the known words between the unknown words is equal to or less than two. Specifically, in the example of FIG. 4, an unknown word 414, an unknown word 420, and an unknown word 428 are regarded as incorrect words since the unknown word 414, the unknown word 420, and the unknown word 428 are unknown words, and a known word 416 and a known word 418 are regarded as incorrect words since the known word 416 and the known word 418 are interposed between the unknown word 414 and the unknown word 420 and the number thereof is two. However, known words 422, 424, and 426 are not regarded as incorrect words since the known words 422, 424, and 426 are interposed between the unknown word 420 and the unknown word 428 but the number thereof is three. In short, the incorrect character sequence output module 140 outputs the unknown word 414, the known word 416, the known word 418, the unknown word 420, and the unknown word 428 as incorrect character sequences.

Figure 5:
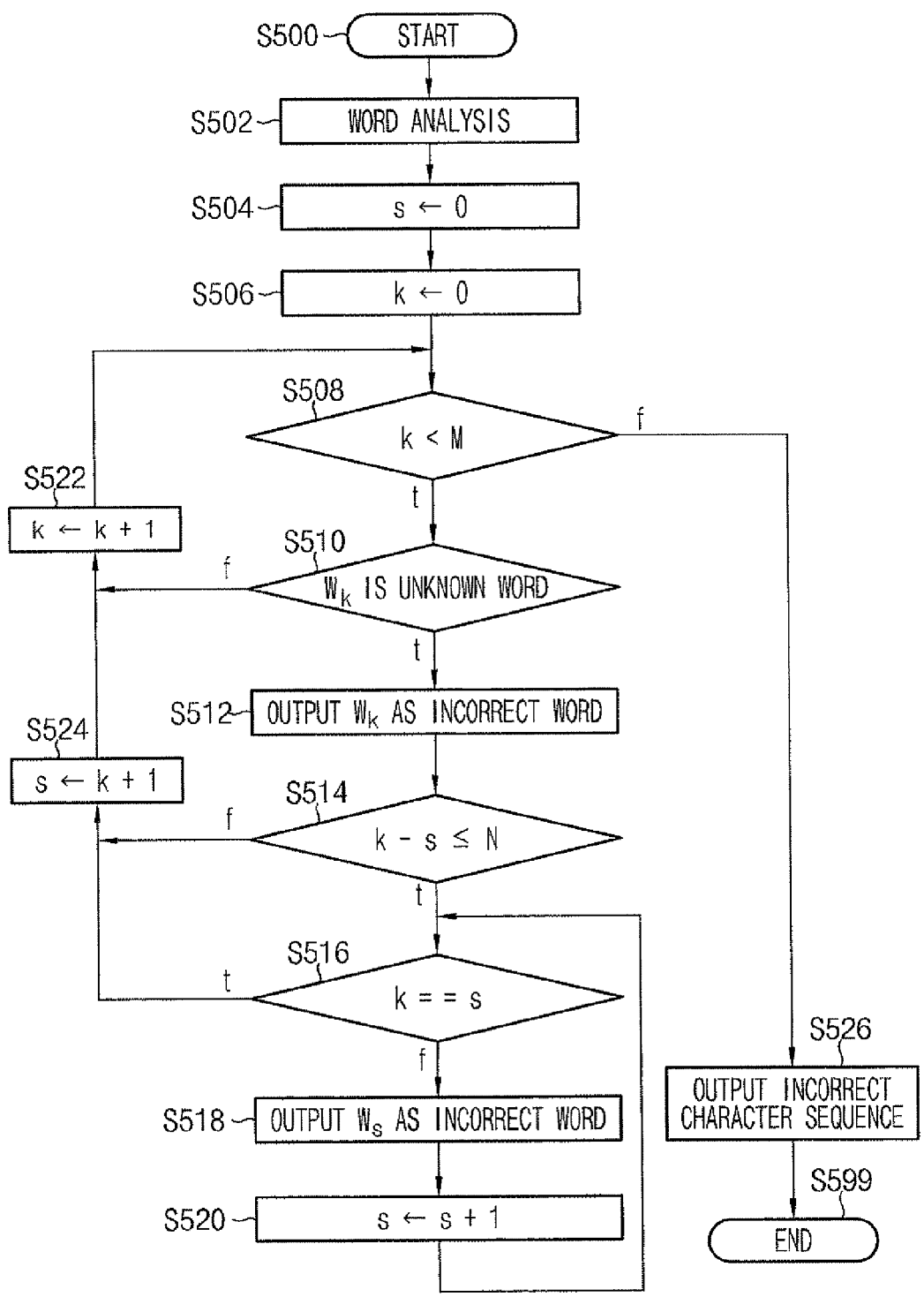
FIG. 5 is a flowchart showing an example of processing according to the first exemplary embodiment.

FIG. 5 is a flowchart showing an example of processing according to the first exemplary embodiment. Here, $W_k$ represents a k-th word obtained as a result of the word analysis. M represents the number of words obtained as a result of the word analysis.

In Step S502, the word analysis module 110 performs the word analysis.

In Step S504, the word sorting module 120 substitutes 0 into a variable s.

In Step S506, the word sorting module 120 substitutes 0 into a variable k.

In Step S508, the word sorting module 120 determines whether or not k<M is satisfied, and the processing proceeds to Step S510 when k<M, or otherwise the processing proceeds to Step S526.

In Step S510, the word sorting module 120 determines whether or not $W_k$ is an unknown word, and the processing proceeds to Step S512 when $W_k$ is an unknown word, or otherwise the processing proceeds to Step S522.

In Step S512, the incorrect word detecting module 130 outputs $W_k$ as an incorrect word to the incorrect character sequence output module 140.

In Step S514, the incorrect word detecting module 130 determines whether or not k−s≤N is satisfied, and the processing proceeds to Step S516 when k−s≤N, or otherwise the processing proceeds to Step S524. Here, the variable k represents an order of an unknown word which appears later (an order in the case of counting from 0), and the variable s represents an order of an unknown word which appears before (an order in the case of counting from 0). Therefore, the determination herein is made regarding whether or not the number of known words interposed between the unknown words is equal to or less than N.

In Step S516, the incorrect word detecting module 130 determines whether or not k==s is satisfied (whether or not k is equal to s), and the processing proceeds to Step S524 when k==s, or otherwise the processing proceeds to Step S518.

In Step S518, the incorrect word detecting module 130 outputs $W_s$ as an incorrect word to the incorrect character sequence output module 140. Here, $W_s$ is a known word.

In Step S520, the incorrect word detecting module 130 substitutes s+1 into a variable s and performs the processing from Step S516.

In Step S522, the word sorting module 120 substitutes k+1 into a variable k. Then, the processing returns to Step S508.

In Step S524, the word sorting module 120 substitutes k+1 into the variable s. Then, the processing proceeds to Step S522.

In Step S526, the incorrect character sequence output module 140 outputs incorrect character sequences. In addition, there is a case in which a known word before an unknown word is output as an incorrect word after the unknown word is output as an incorrect word in Step S512. In such a case, the output is not based on the character sequence. Therefore, the incorrect character sequence output module 140 may add flags to incorrect words, for example, and output the incorrect words with flags in an order of the character sequences received by the word analysis module 110.

Figure 6:
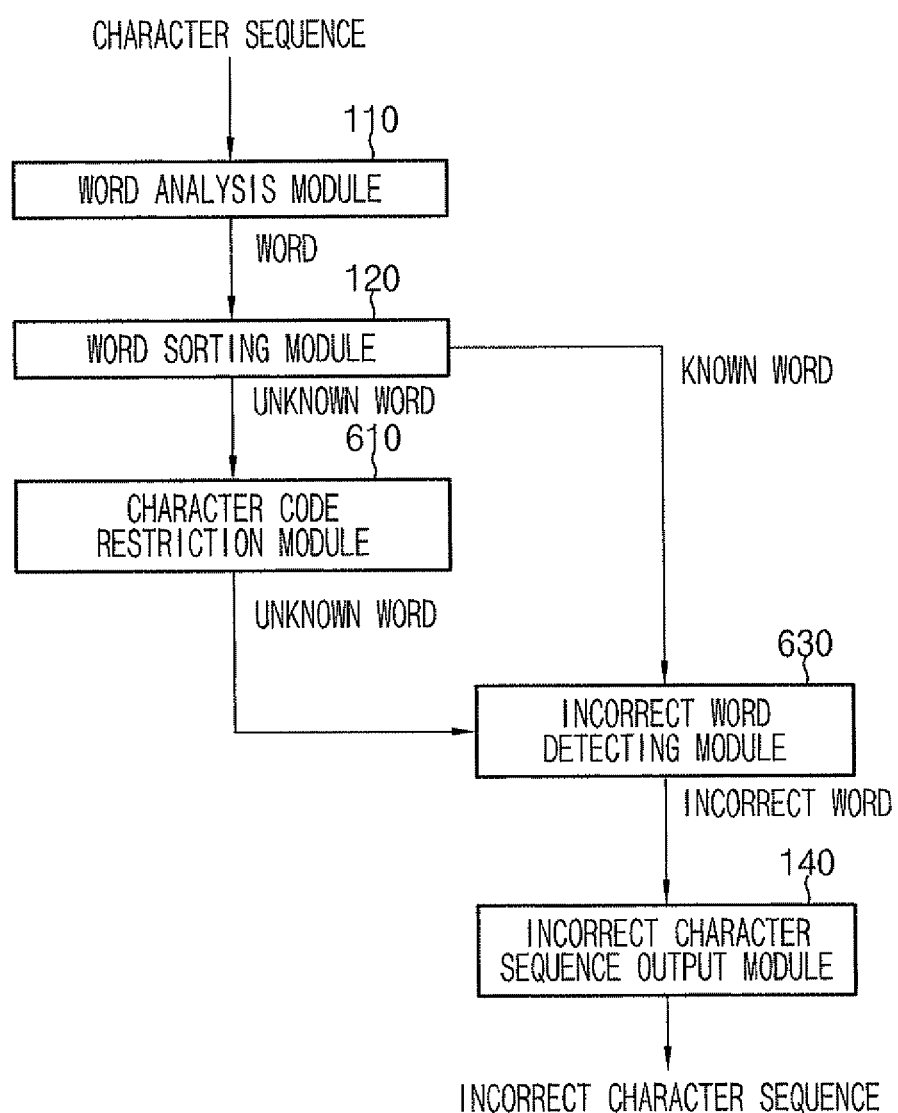
FIG. 6 is a conceptual module configuration diagram of a configuration example according to a second exemplary embodiment.

FIG. 6 is a conceptual module configuration diagram of a configuration example according to a second exemplary embodiment. In addition, the same reference numerals are added to the same parts in the aforementioned exemplary embodiment, and the repeated description will be omitted (hereinafter, the same is true).

An exemplary embodiment of performing character code restriction in error detection for character sequences will be described.

By performing the character code restriction, detection of a known word, which does not include any error, as an incorrect word is reduced. For example, when the target of the processing by the word analysis module 110 and the word sorting module 120 is only Japanese, an English word is detected as an unknown word at a high ratio. At this time, a known word including no error is detected as an incorrect word.

Thus, only unknown words including Chinese characters, hiragana, and katakana are output as unknown words in the character code restriction from among the unknown words detected as a result of the word analysis and the word sorting.

In the second exemplary embodiment, the word analysis module 110, the word sorting module 120, a character code restriction module 610, an incorrect word detecting module 630, and the incorrect character sequence output module 140 are provided.

The word sorting module 120 is connected to the word analysis module 110, the character code restriction module 610, and the incorrect word detecting module 630, receives words from the word analysis module 110, sorts the words into known words and unknown words, passes the sorted known words to the incorrect word detecting module 630, and passes the unknown words to the character code restriction module 610.

The character code restriction module 610 is connected to the word sorting module 120 and the incorrect word detecting module 630 and determines whether or not character sequences are unknown words depending on whether or not character codes of characters constituting the character sequences sorted as unknown words by the word sorting module 120 are based on a predetermined rule relating to character codes. As the predetermined rule relating to the character codes, the aforementioned rule is applicable in which words including character codes of Chinese characters, hiragana, and katakana are regarded as unknown words, or another rule in which words including character codes of Chinese characters, hiragana, and katakana and character codes of alphanumeric characters are regarded as unknown words or in which words including only character codes of alphanumeric characters are not regarded as unknown words is also applicable. Furthermore, the rule may be determined in accordance with a target language of the word analysis module 110 and the word sorting module 120. That is, when an unknown word received by the word sorting module 120 is configured by character codes which are mainly used in the target language of the word analysis module 110 and the word sorting module 120, the unknown word is passed as an unknown word to the incorrect word detecting module 630, or otherwise the unknown word is passed as a known word to the incorrect word detecting module 630. The character code restriction module 610 determines that a word is an unknown word (namely, a second unknown word) when the word is sorted as an unknown word by the word sorting module 120 (namely, a first unknown word) and is further based on the predetermined rule relating to the character codes.

The incorrect word detecting module 630 is connected to the word sorting module 120, the character code restriction module 610, and the incorrect character sequence output module 140, detects the character sequences determined to be unknown words by the character code restriction module 610 as incorrect words, and detects a sixth character sequence between a fourth character sequence and a fifth character sequence, which have been determined to be unknown words by the character code restriction module 610, as an incorrect word when the sixth character sequence includes words determined to be known words by the word sorting module 120 (words for which it has been determined by the character code restriction module 610 that the words are not unknown words (known words) may be included) and the number of the known words is less than or equal to or less than a predetermined number. Then, the detected incorrect words are output to the incorrect character sequence output module 140.

The incorrect character sequence output module 140 is connected to the incorrect word detecting module 630, receives the incorrect words from the incorrect word detecting module 130, creates incorrect character sequences from the incorrect words, and outputs the created incorrect character sequences.

Figure 7:
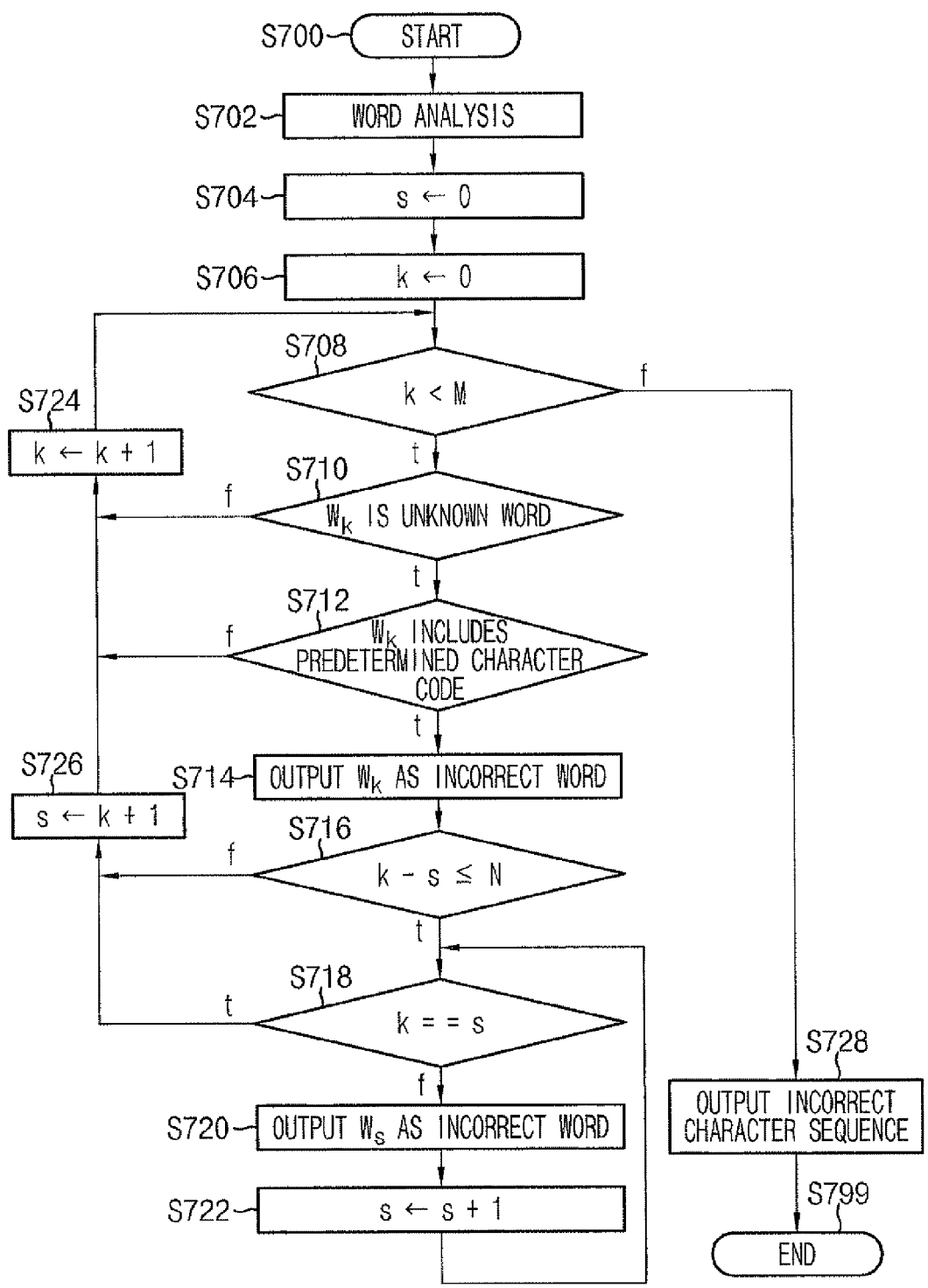
FIG. 7 is a flowchart showing an example of processing according to the second exemplary embodiment.

FIG. 7 is a flowchart showing an example of processing according to the second exemplary embodiment.

In Step S702, the word analysis module 110 performs the word analysis.

In Step S704, the word sorting module 120 substitutes 0 into the variable s.

In Step S706, the word sorting module 120 substitutes 0 into the variable k.

In Step S708, the word sorting module 120 determines whether or not k<M is satisfied, the processing proceeds to Step S710 when k<M, and the processing proceeds to Step S728 in the other case.

In Step S710, the word sorting module 120 determines whether or not $W_k$ is an unknown word, and the processing proceeds to Step S712 when $W_k$ is an unknown word, or otherwise the processing proceeds to Step S724.

In Step S712, the character code restriction module 610 determines whether or not $W_k$ includes a predetermined character code, and the processing proceeds to Step S714 when $W_k$ includes a predetermined character code, or otherwise the processing proceeds to Step S724.

In Step S714, the incorrect word detecting module 630 outputs $W_k$ as an incorrect word to the incorrect character sequence output module 140.

In Step S716, the incorrect word detecting module 630 determines whether or not k−s≤N is satisfied, and the processing proceeds to Step S718 when k−s≤N, or otherwise the processing proceeds to Step S726.

In Step S718, the incorrect word detecting module 630 determines whether or not k==s is satisfied, and the processing proceeds to Step S726 when k==s, or otherwise the processing proceeds to Step S720.

In Step S720, the incorrect word detecting module 630 outputs $W_s$ as an incorrect word to the incorrect character sequence output module 140.

In Step S722, the incorrect word detecting module 630 substitutes s+1 into the variable s and performs the processing from Step S718.

In Step S724, the word sorting module 120 substitutes k+1 into the variable k. Then, the processing returns to Step S708.

In Step S726, the word sorting module 120 substitutes k+1 into the variable s. Then, the processing proceeds to Step S724.

In Step S728, the incorrect character sequence output module 140 outputs an incorrect character sequence.

Figure 8:
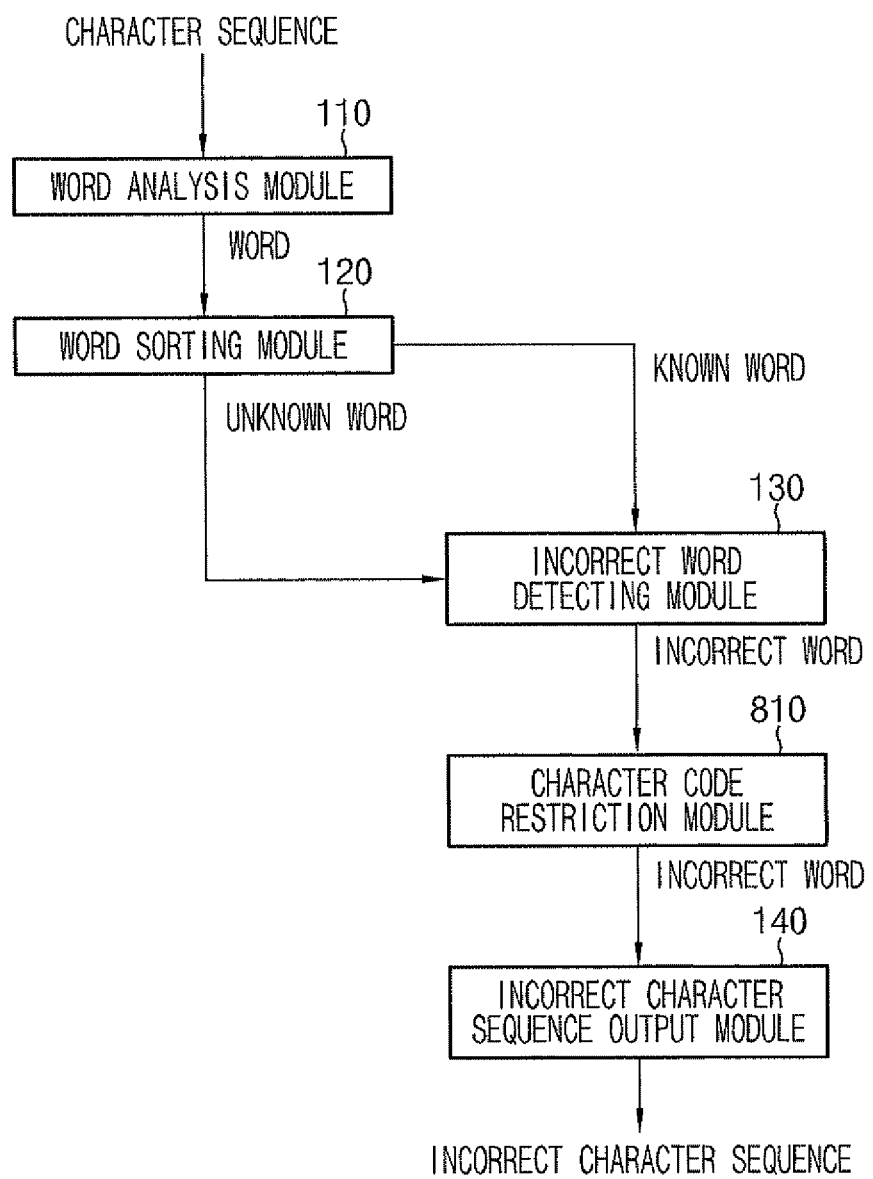
FIG. 8 is a conceptual module configuration diagram of a configuration example according to a third exemplary embodiment.

FIG. 8 is a conceptual module configuration diagram of a configuration example according to a third exemplary embodiment.

An exemplary embodiment of performing the character code restriction in error detection for character sequences will be described. The third exemplary embodiment is different from the second exemplary embodiment in that the character code restriction is performed after the incorrect word detecting module 130.

According to the third exemplary embodiment, the word analysis module 110, the word sorting module 120, the incorrect word detecting module 130, a character code restriction module 810, and the incorrect character sequence output module 140 are provided.

The incorrect word detecting module 130 is connected to the word sorting module 120 and the character code restriction module 810, detects character sequences sorted as unknown words by the word sorting module 120 as incorrect words, and detects a third character sequence between a first character sequence and a second character sequence, which have been sorted as unknown words by word sorting module 120, as incorrect words when the third character sequence includes words sorted as known words by the word sorting module 120 and the number of the known words is less than or equal to or less than a predetermined number. That is, the incorrect word detecting module 130 receives known words and unknown words from the word sorting module 120, detects incorrect words from the known words and the unknown words, and outputs the detected incorrect words to the character code restriction module 810.

The character code restriction module 810 is connected to the incorrect word detecting module 130 and the incorrect character sequence output module 140 and determines whether or not a character sequence is an incorrect word depending on whether or not character codes of characters constituting the character sequence detected as an incorrect word by the incorrect word detecting module 130 are based on a predetermined rule relating to character codes. Then, the incorrect word is output to the incorrect character sequence output module 140. The predetermined rule relating to the character codes is the same as that used by the character code restriction module 610 in the aforementioned second exemplary embodiment. The character code restriction module 810 determines that a word is an incorrect word (namely, a second incorrect word) when the word is detected as an incorrect word by the incorrect word detecting module 130 (namely, a first incorrect word) and is further based on the predetermined rule relating to the character codes.

The incorrect character sequence output module 140 is connected to the character code restriction module 810, receives incorrect words from the character code restriction module 810, creates incorrect character sequences from the incorrect words, and outputs the created incorrect character sequences.

Figure 9:
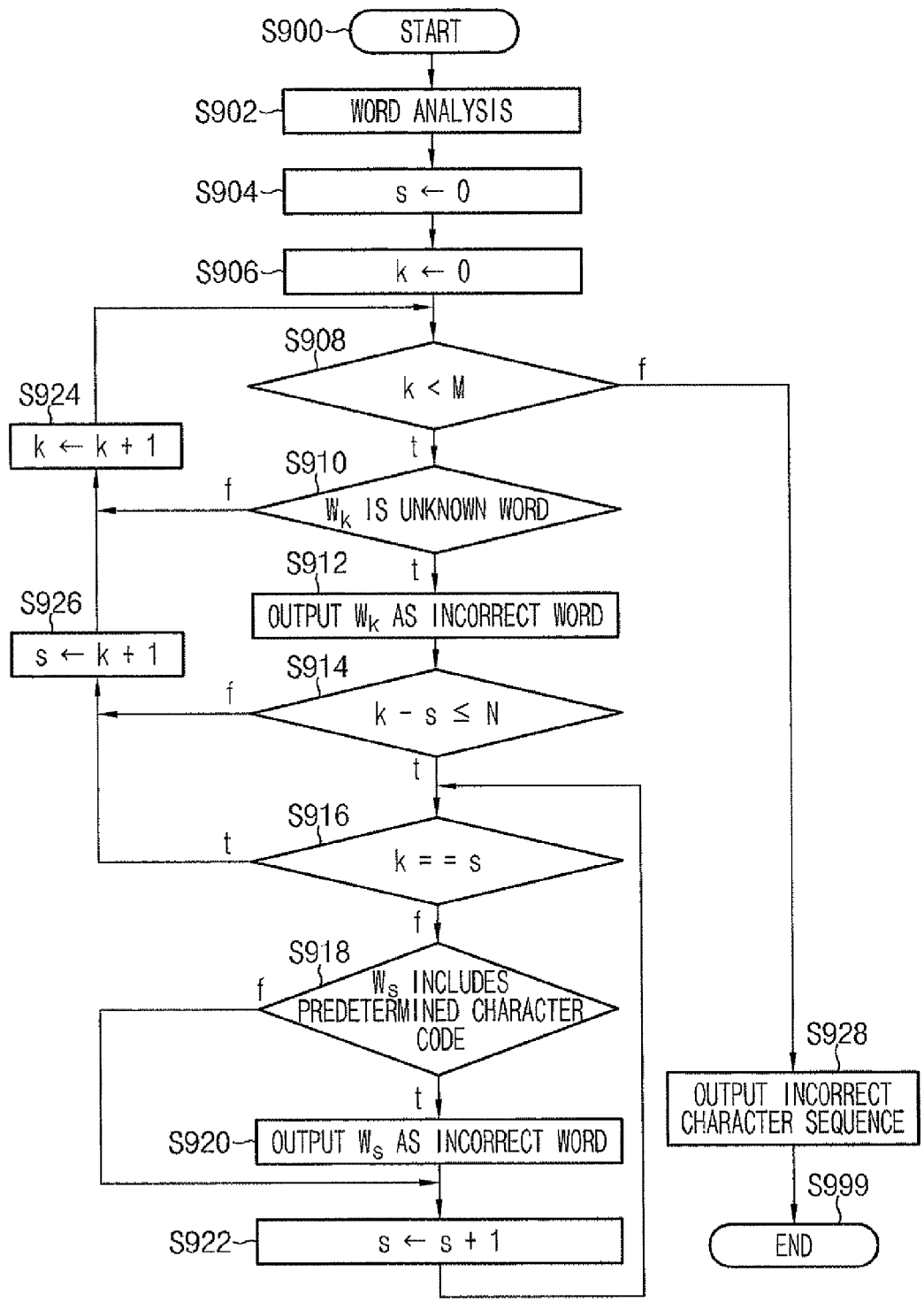
FIG. 9 is a flowchart showing an example of processing according to the third exemplary embodiment.

FIG. 9 is a flowchart showing an example of processing according to the third exemplary embodiment.

In Step S902, the word analysis module 110 performs the word analysis.

In Step S904, the word sorting module 120 substitutes 0 into the variable s.

In Step S906, the word sorting module 120 substitutes 0 into the variable k.

In Step S908, the word sorting module 120 determines whether or not k<M is satisfied, and the process proceeds to Step S910 when k<M, or otherwise the process proceeds to Step S928.

In Step S910, the word sorting module 120 determines whether or not $W_k$ is an unknown word, and the process proceeds to Step S912 when $W_k$ is an unknown word, or otherwise the process proceeds to Step S924.

In Step S912, the incorrect word detecting module 130 outputs $W_k$ as an incorrect word to the character code restriction module 810.

In Step S914, the incorrect word detecting module 130 determines whether or not k−s≤N is satisfied, and the process proceeds to Step S916 when k−s≤N, or otherwise the process proceeds to Step S926.

In Step S916, the incorrect word detecting module 130 determines whether or not k==s is satisfied, and the process proceeds to Step S926 when k==s, or otherwise the process proceeds to Step S918.

In Step S918, the character code restriction module 810 determines whether or not $W_s$ includes a predetermined character code, and the process proceeds to Step S920 when $W_s$ includes the predetermined character code, or otherwise the process proceeds to Step S922.

In Step S920, the character code restriction module 810 outputs $W_s$ as an incorrect word to the incorrect character sequence output module 140.

In Step S922, the incorrect word detecting module 130 substitutes s+1 into the variable s and performs the processing from Step S916.

In Step S924, the word sorting module 120 substitutes k+1 into the variable k. Then, the process returns to Step S908.

In Step S926, the word sorting module 120 substitutes k+1 into the variable s. Then, the process proceeds to Step S924.

In Step S928, the incorrect character sequence output module 140 outputs an incorrect character sequence.

Figure 10:
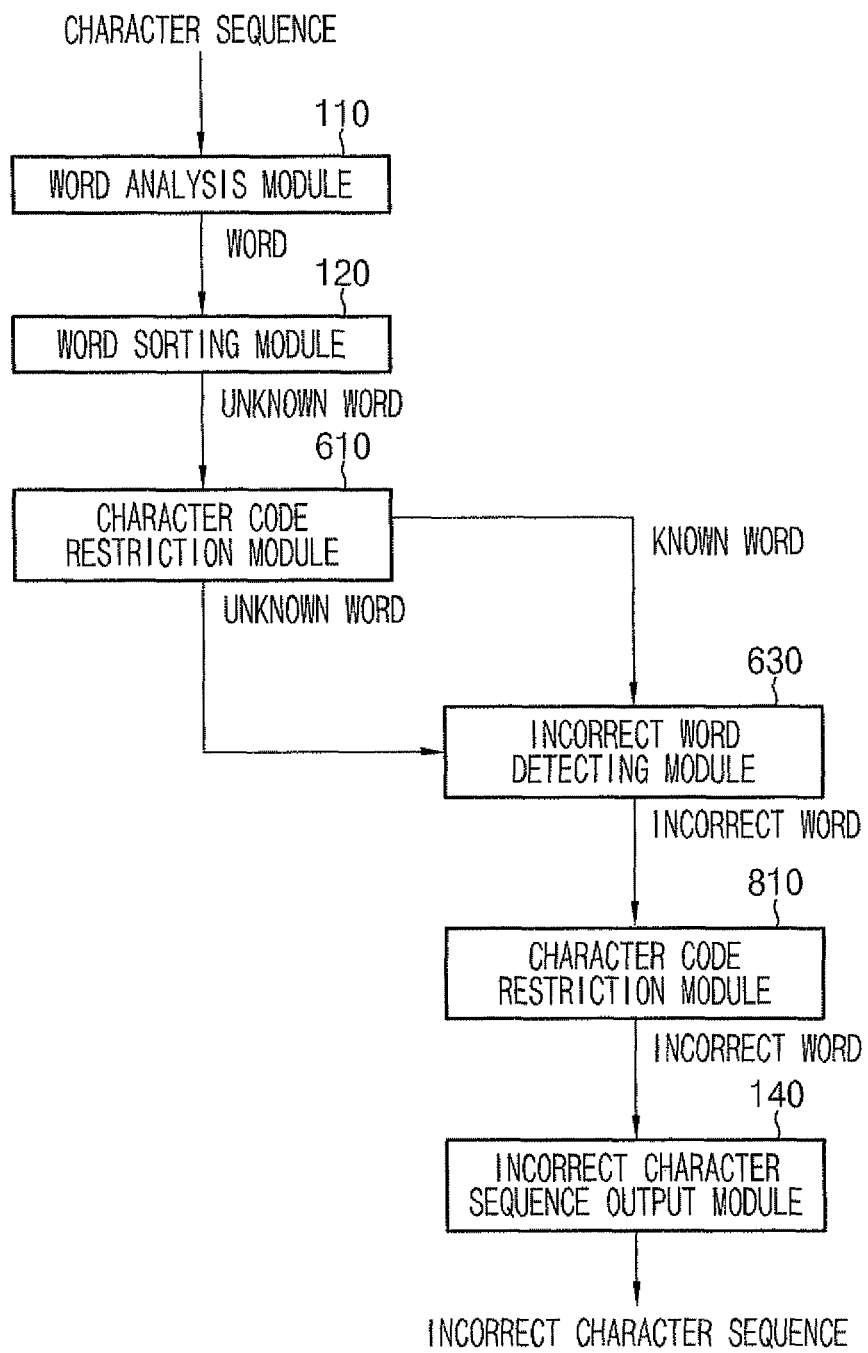
FIG. 10 is a conceptual module configuration diagram of a configuration example according to a fourth exemplary embodiment.

FIG. 10 is a conceptual module configuration diagram of a configuration example according to a fourth exemplary embodiment.

An exemplary embodiment of performing character code restriction in error detection for character sequences will be described. The fourth exemplary embodiment is the combination of the second exemplary embodiment and the third exemplary embodiment.

According to the fourth exemplary embodiment, the word analysis module 110, the word sorting module 120, the character code restriction module 610, the incorrect word detecting module 630, the character code restriction module 810, and the incorrect character sequence output module 140 are provided.

The incorrect word detecting module 630 is connected to the word sorting module 120, the character code restriction module 610, and the character code restriction module 810, detects the character sequences determined to be unknown words by the character code restriction module 610 as incorrect words, and detects a sixth character sequence between a fourth character sequence and a fifth character sequence, which have been determined to be unknown words by the character code restriction module 610, as incorrect words when the sixth character sequence includes words determined to be known words by the word sorting module 120 (words for which it has been determined by the character code restriction module 610 that the words are not unknown words (known words) may be included) and the number of the known words is less than or equal to or less than a predetermined number. Then, the detected incorrect words are output to the character code restriction module 810.

The character code restriction module 810 is connected to the incorrect word detecting module 630 and the incorrect character sequence output module 140 and determines whether or not the sixth character sequence is an incorrect word depending on whether or not character codes of characters constituting the sixth character sequence detected as an incorrect word by the incorrect word detecting module 630 are based on a predetermined rule relating to character codes.

Then, the incorrect words are output to the incorrect character sequence output module 140. The predetermined rule relating to the character codes is the same as that used by the character code restriction module 610 in the aforementioned second exemplary embodiment.

The incorrect character sequence output module 140 is connected to the character code restriction module 810, receives incorrect words from the character code restriction module 810, creates incorrect character sequences from the incorrect words, and outputs the created incorrect character sequences.

Figure 11:
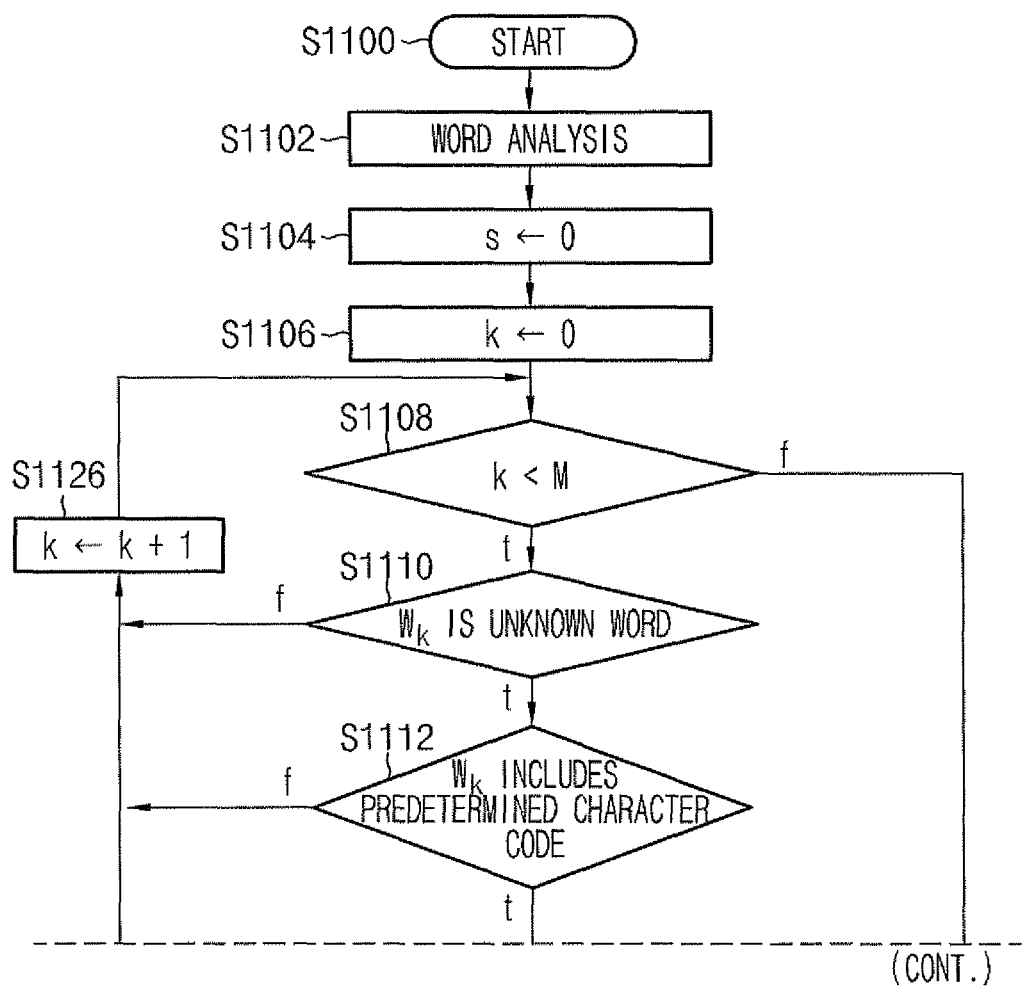
FIG. 11 is a flowchart showing an example of processing according to the fourth exemplary embodiment.

FIG. 11 is a flowchart showing an example of processing according to the fourth exemplary embodiment.

In Step S1102, the word analysis module 110 performs the word analysis.

In Step S1104, the word sorting module 120 substitutes 0 into the variable s.

In Step S1106, the word sorting module 120 substitutes 0 into the variable k.

In Step S1108, the word sorting module 120 determines whether or not k<M is satisfied, and the processing proceeds to Step S1110 when k<M, or otherwise the process proceeds to Step S1130.

In Step S1110, the word sorting module 120 determines whether or not $W_k$ is an unknown word, and the process proceeds to Step S1112 when $W_k$ is an unknown word, or otherwise the process proceeds to Step S1126.

In Step S1112, the character code restriction module 610 determines whether or not $W_k$ includes a predetermined character code, and the process proceeds to Step S1114 when $W_k$ includes the predetermined character code, or otherwise the process proceeds to Step S1126.

In Step S1114, the incorrect word detecting module 630 outputs $W_k$ as an incorrect word to the character code restriction module 810.

In Step S1116, the incorrect word detecting module 630 determines whether or not k−s≤N, and the process proceeds to Step S1118 when k−s≤N, or otherwise the process proceeds to Step S1128.

In Step S1118, the incorrect word detecting module 630 determines whether or not k==s is satisfied, and the process proceeds to Step S1128 when k==s, or otherwise the process proceeds to Step S1120.

In Step S1120, the character code restriction module 810 determines whether or not $W_s$ includes a predetermined character code, and the process proceeds to Step S1122 when $W_s$ includes a predetermined character code, or otherwise the process proceeds to Step S1124.

In Step S1122, the character code restriction module 810 outputs $W_s$ as an incorrect word to the incorrect character sequence output module 140.

In Step S1124, the character code restriction module 810 substitutes s+1 into the variable s and performs the processing from Step S1118.

In Step S1126, the word sorting module 120 substitutes k+1 into the variable k. Then, the process returns to Step S1108.

In Step S1128, the word sorting module 120 substitutes k+1 into the variable s. Then, the process proceeds to Step S1126.

In Step S1130, the incorrect character sequence output module 140 outputs an incorrect character sequence.

Figure 12:
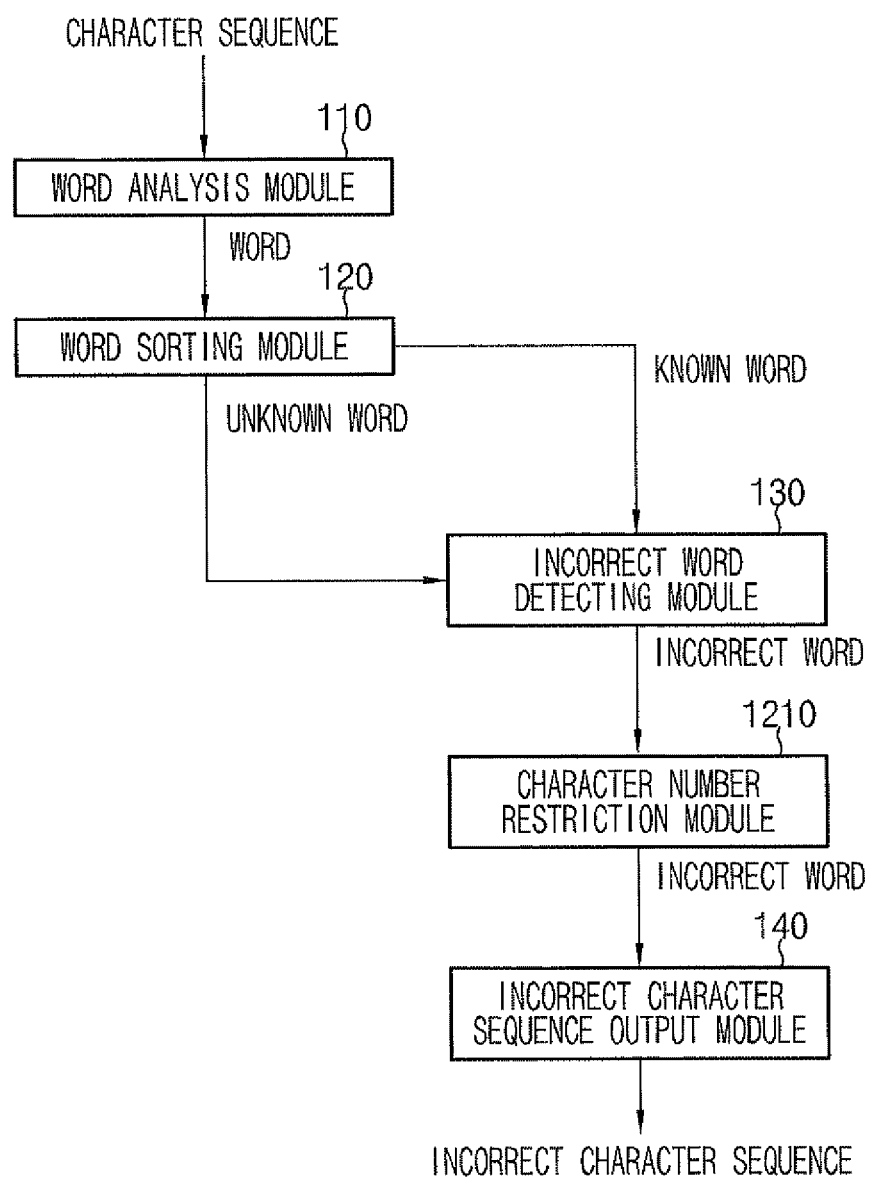
FIG. 12 is a conceptual module configuration diagram of a configuration example according to a fifth exemplary embodiment.

FIG. 12 is a conceptual module configuration diagram of a configuration example according to a fifth exemplary embodiment.

An exemplary embodiment of performing character number restriction in error detection for character sequences will be described.

By performing the character code restriction, detection of a known word, which does not include any error, as an incorrect word is reduced. For example, when the number of characters in a known word is large, this known word is not an incorrect word at a high ratio. However, there is a case in which a known word is interposed between unknown words and detected as an incorrect word according to the aforementioned exemplary embodiments.

Thus, only known words including a number of characters which is less than or equal to or less than a predetermined number of characters are output as incorrect words.

According to the fifth exemplary embodiment, the word analysis module 110, the word sorting module 120, the incorrect word detecting module 130, a character number restriction module 1210, and the incorrect character sequence output module 140 are provided.

The incorrect word detecting module 130 is connected to the word sorting module 120 and the character number restriction module 1210, and the incorrect word detecting module 130 detects the character sequences sorted as unknown words by the word sorting module 120 as incorrect words, and detects a third character sequence between a first character sequence and a second character sequence, which have been sorted as unknown words by the word sorting module 120, as incorrect words when the third character sequence includes words determined to be known words by the word sorting module 120 and the number of the known words is less than or equal to or less than a predetermined number. That is, the incorrect word detecting module 130 receives known words and unknown words from the word sorting module 120, detects incorrect words from the known words and the unknown words, and outputs the detected incorrect words to the character number restriction module 1210.

The character number restriction module 1210 is connected to the incorrect word detecting module 130 and the incorrect character sequence output module 140. The character number restriction module 1210 determines whether or not a third character sequence is an incorrect word depending on whether or not a length of the third character sequence detected as an incorrect word by the incorrect word detecting module 130 is less than or equal to or less than a predetermined length. That is, when the length of the third character sequence detected as an incorrect word by the incorrect word detecting module 130 is less than or equal to or less than the predetermined length, the third character sequence is detected as an incorrect word. In the above example, when the third character sequence is interposed between unknown words and includes N or a smaller number of known words, and the entire length of the known words interposed between the unknown words (that is, the sum of the lengths of character sequences of the known words interposed between the unknown words) is less than or equal to or less than the predetermined length, the third character sequence is detected as an incorrect word. The character number restriction module 1210 determines that a character sequence is an incorrect word (namely, the third incorrect word) when the incorrect word detecting module 130 detects the character sequence as an incorrect word (namely, the first incorrect word), and further, the length of the third character sequence is less than or equal to or less than the predetermined length. Then, the incorrect word is output to the incorrect character sequence output module 140.

In addition, another configuration is also applicable in which the third character sequence is detected as an incorrect word when the third character sequence is interposed between unknown words and includes N or a smaller number of known words and the length of each known word interposed between the unknown words is less than or equal to or less than a predetermined length. Alternatively, another configuration is also applicable in which the third character sequence (all known words interposed between the unknown words) is detected as an incorrect word as long as at least one of the character sequence lengths of the known words interposed between the unknown words is less than or equal to or less than the predetermined length. Alternatively, another configuration is also applicable in which the third character sequence (all known words interposed between the unknown words) is detected as an incorrect word when character sequence lengths of all known words between the unknown words are less than or equal to or less than the predetermined length. In addition, another configuration is also applicable in which a known word is detected as an incorrect word when the character sequence length of the known word is less than or equal to or less than the predetermined length from among the character sequence lengths of the known words interposed between the unknown words. That is, some known words are detected as incorrect words while other known words are not detected as incorrect words even if the known words are interposed between unknown words and include N or a smaller number of known words.

The incorrect character sequence output module 140 is connected to the character number restriction module 1210, receives incorrect words from the character number restriction module 1210, creates incorrect character sequences from the error words, and outputs the created incorrect character sequence.

Figure 13:
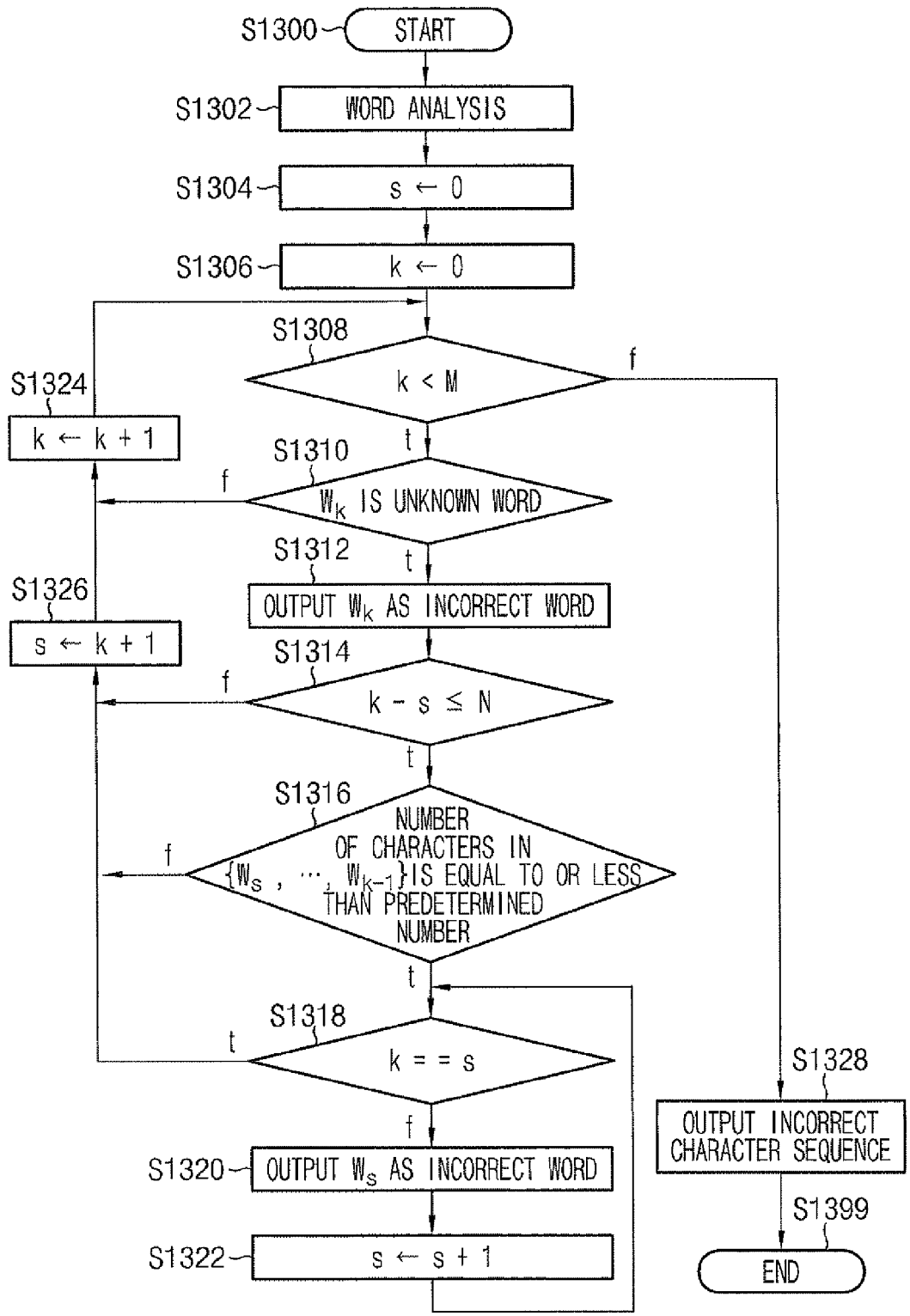
FIG. 13 is a flowchart showing an example of processing according to the fifth exemplary embodiment.

FIG. 13 is a flowchart showing an example of processing according to the fifth exemplary embodiment.

In Step S1302, the word analysis module 110 performs the word analysis.

In Step S1304, the word sorting module 120 substitutes 0 into the variable s.

In Step S1306, the word sorting module 120 substitutes 0 into the variable k.

In Step S1308, the word sorting module 120 determines whether or not k<M is satisfied, and the processing proceeds to Step S1310 when k<M, or otherwise the processing proceeds to Step S1328.

In Step S1310, the word sorting module 120 determines whether or not $W_k$ is an unknown word, and the processing proceeds to Step S1312 when $W_k$ is an unknown word, or otherwise the processing proceeds to Step S1324.

In Step S1312, the incorrect word detecting module 130 outputs $W_k$ as an incorrect word to the character number restriction module 1210. In addition, the incorrect word detecting module 130 may output $W_k$ to the incorrect character sequence output module 140.

In Step S1314, the incorrect word detecting module 130 determines whether or not k−s≤N is satisfied, and the processing proceeds to Step S1316 when k−s≤N, or otherwise the processing proceeds to Step S1326.

In Step S1316, the character number restriction module 1210 determines whether or not the total character sequence length from $W_s$ to $W_{k-1}$ (the character sequence length in the case of coupling the character sequences from $W_s$ to $W_{k-1}$) is equal to or less than a predetermined number of characters, and the processing proceeds to Step S1318 when the character sequence length is equal to or less than the predetermined number of characters, or otherwise the processing proceeds to Step S1326.

In Step S1318, the character number restriction module 1210 determines whether or not k==s is satisfied, and the processing proceeds to Step S1326 when k==s, or otherwise the processing proceeds to Step S1320.

In Step S1320, the character number restriction module 1210 outputs $W_s$ as an incorrect word to the character number restriction module 1210.

In Step S1322, the character number restriction module 1210 substitutes s+1 into the variable s and performs the processing from Step S1318.

In Step S1324, the word sorting module 120 substitutes k+1 into the variable k. Then, the processing returns to Step S1308.

In Step S1326, the word sorting module 120 substitutes k+1 into the variable s. Then, the processing proceeds to Step S1324.

In Step S1328, the incorrect character sequence output module 140 outputs an incorrect character sequence.

Figure 14:
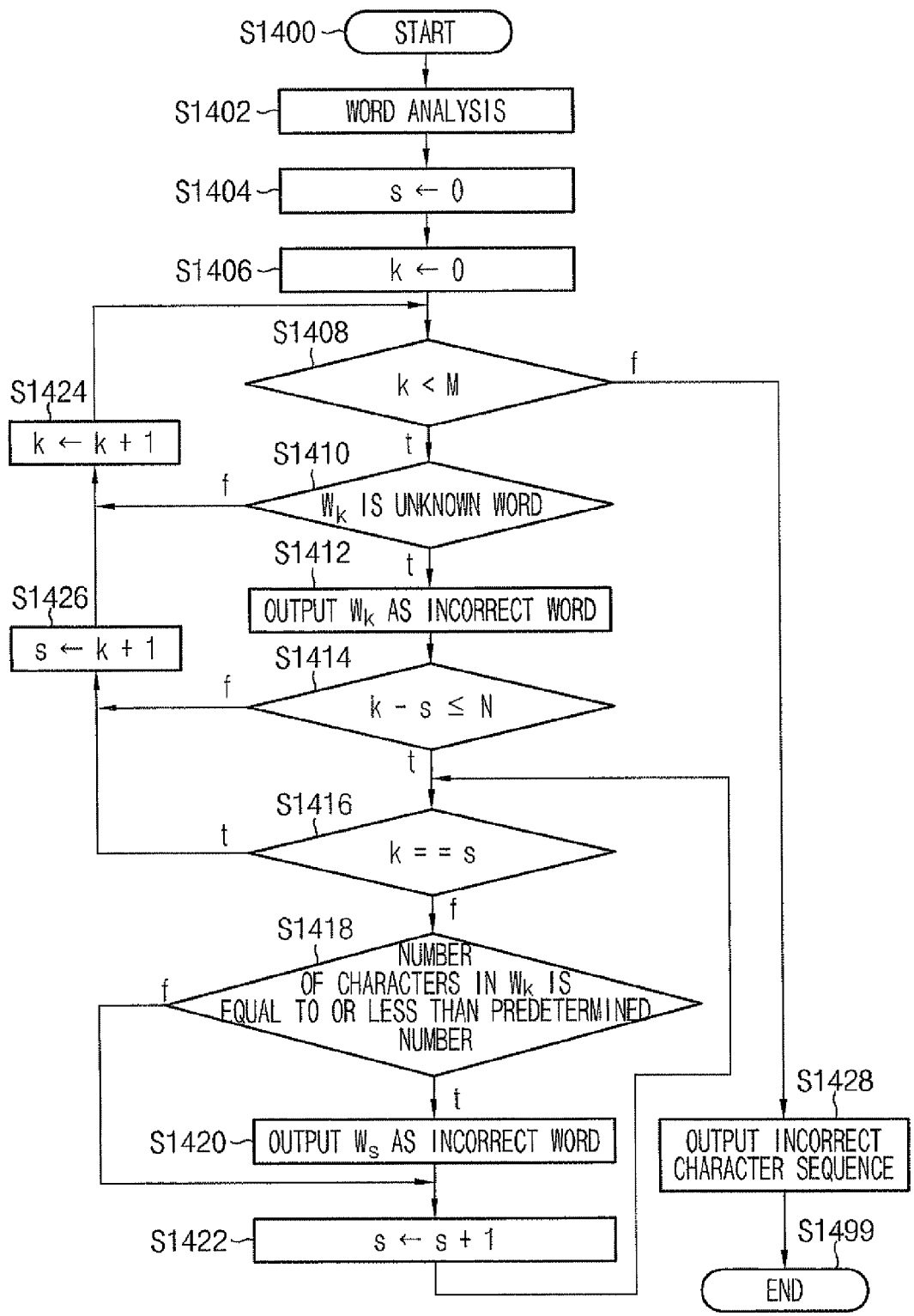
FIG. 14 is a flowchart showing another example of processing according to the fifth exemplary embodiment.

FIG. 14 is a flowchart showing another example of processing according to the fifth exemplary embodiment.

In Step S1402, the word analysis module 110 performs the word analysis.

In Step S1404, the word sorting module 120 substitutes 0 into the variable s.

In Step S1406, the word sorting module 120 substitutes 0 into the variable k.

In Step S1408, the word sorting module 120 determines whether or not k<M is satisfied, and the processing proceeds to Step S1410 when k<M, or otherwise the processing proceeds to Step S1428.

In Step S1410, the word sorting module 120 determines whether or not $W_k$ is an unknown word, and the processing proceeds to Step S1412 when $W_k$ is an unknown word, or otherwise the processing proceeds to Step S1424.

In Step S1412, the incorrect word detecting module 130 outputs $W_k$ as an incorrect word to the character number restriction module 1210. In addition, the incorrect word detecting module 130 may output $W_k$ to the incorrect character sequence output module 140.

In Step S1414, the incorrect word detecting module 130 determines whether or not k−s≤N, and the processing proceeds to Step S1416 when k−s≤SN, or otherwise the processing proceeds to Step S1426.

In Step S1416, the character number restriction module 1210 determines whether or not k==s is satisfied, and the processing proceeds to Step S1426 when k==s, or otherwise the processing proceeds to Step S1418.

In Step S1418, the character number restriction module 1210 determines whether or not the character sequence length of $W_s$ (the individual character sequence length) is equal to or less than a predetermined number of characters, and the processing proceeds to Step S1420 when the character sequence length of $W_s$ is equal to or less than the predetermined number of characters, or otherwise the processing proceeds to Step S1422.

In Step S1420, the character number restriction module 1210 outputs $W_s$ as an incorrect word to the character number restriction module 1210.

In Step S1422, the character number restriction module 1210 substitutes s+1 into the variable s and performs the processing from Step S1416.

In Step S1424, the word sorting module 120 substitutes k+1 into the variable k. Then, the processing returns to Step S1408.

In Step S1426, the word sorting module 120 substitutes k+1 into the variable s. Then, the processing proceeds to Step S1424.

In Step S1428, the incorrect character sequence output module 140 outputs an incorrect character sequence.

Figure 15:
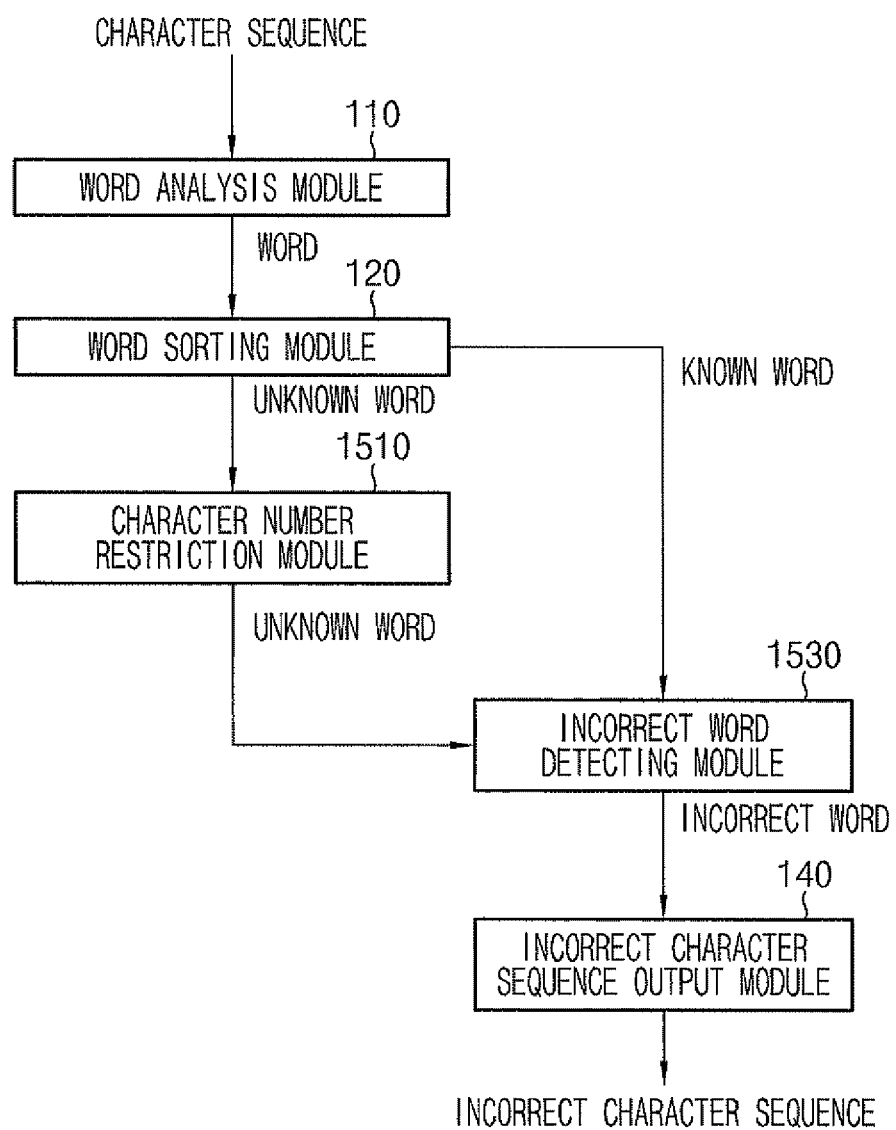
FIG. 15 is a conceptual module configuration diagram of a configuration example according to a sixth exemplary embodiment.

FIG. 15 is a conceptual module configuration diagram of a configuration example according to a sixth exemplary embodiment.

An exemplary embodiment of performing character number restriction in error detection for character sequences will be described. The sixth exemplary embodiment is different from the fifth exemplary embodiment in that the character number restriction is performed on the character sequences sorted as known words by the word sorting module 120.

According to the sixth exemplary embodiment, the word analysis module 110, the word sorting module 120, a character number restriction module 1510, an incorrect word detecting module 1530, and the incorrect character sequence output module 140 are provided.

The word sorting module 120 is connected to the character number restriction module 1510 and the incorrect word detecting module 1530, outputs unknown words to the character number restriction module 1510, and outputs known words to the incorrect word detecting module 1530.

The character number restriction module 1510 is connected to the word sorting module 120 and the incorrect word detecting module 1530 and determines whether or not a character sequence sorted as an unknown word by the word sorting module 120 is an unknown word depending on whether or not the length of the character sequence is less than or equal to or less than a predetermined length. That is, a character sequence sorted as an unknown word by the word sorting module 120 is determined to be an unknown word when the length of the character sequence is less than or equal to or less than the predetermined length. On the other hand, it is determined that a character sequence is not an unknown word when the length of the character sequence is less than or equal to or less than the predetermined length even though the character sequence has been sorted as an unknown word by the word sorting module 120.

The incorrect word detecting module 1530 is connected to the word sorting module 120, the character number restriction module 1510, and the incorrect character sequence output module 140, detects character sequences determined to be unknown words by the character number restriction module 1510 as incorrect words, and detects a ninth character sequence between a seventh character sequence and an eighth character sequence, which have been determined to be unknown words by the character number restriction module 1510, as incorrect words when the ninth sequence includes words determined to be known words by the word sorting module 120 and the number of the known words is less than or equal to or less than a predetermined number. Then, the detected incorrect words are output to the incorrect character sequence output module 140.

The incorrect character sequence output module 140 is connected to the incorrect word detecting module 1530, receives the error words from the incorrect word detecting module 1530, creates incorrect character sequences from the incorrect words, and outputs the created incorrect character sequences.

Figure 16:
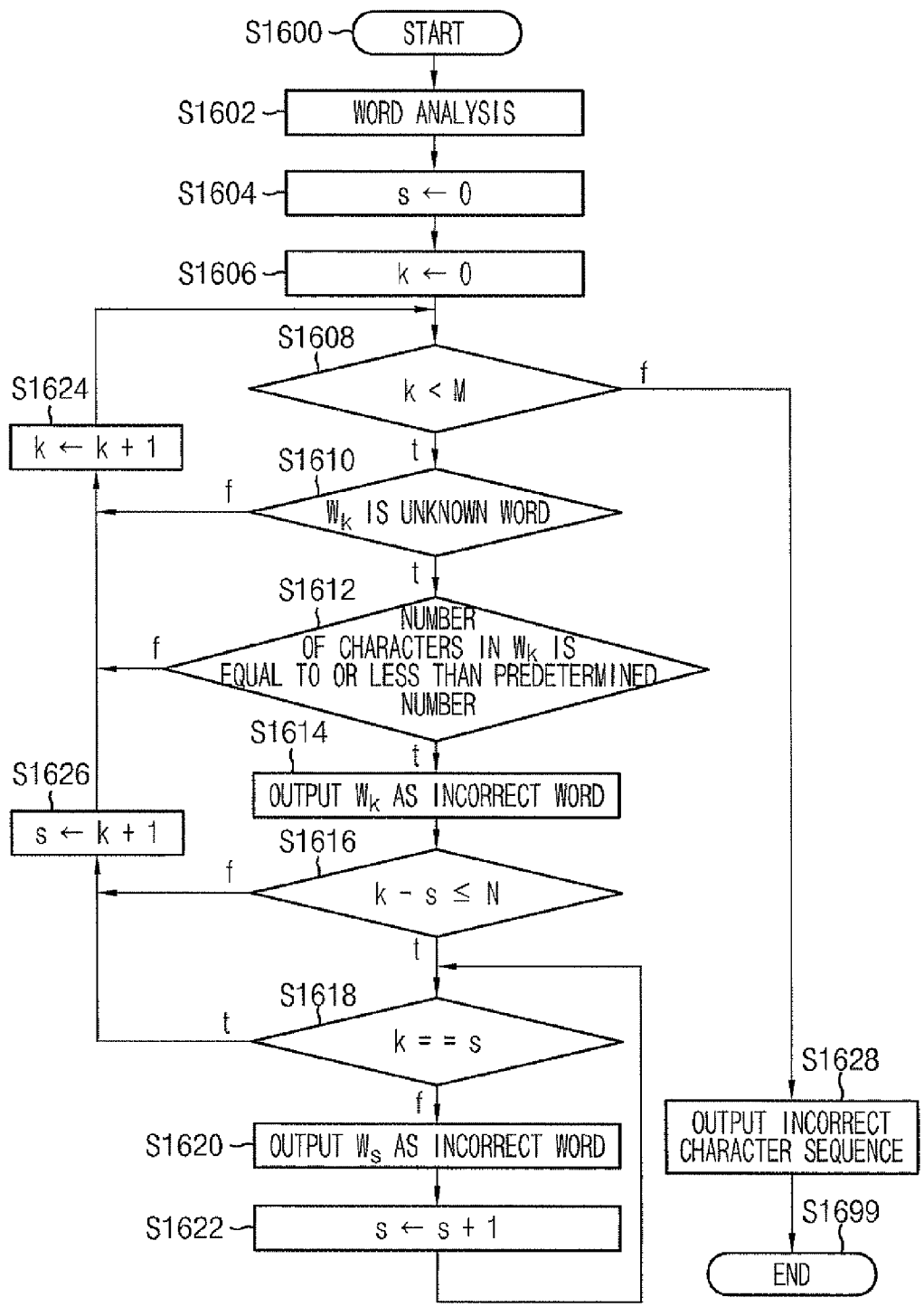
FIG. 16 is a flowchart showing an example of processing according to the sixth exemplary embodiment.

FIG. 16 is a flowchart showing an example of processing according to the sixth exemplary embodiment.

In Step S1602, the word analysis module 110 performs the word analysis.

In Step S1604, the word sorting module 120 substitutes 0 into the variable s.

In Step S1606, the word sorting module 120 substitutes 0 into the variable k.

In Step S1608, the word sorting module 120 determines whether or not k<M is satisfied, and the processing proceeds to Step S1610 when k<M, or otherwise the processing proceeds to Step S1628.

In Step S1610, the word sorting module 120 determines whether or not $W_k$ is an unknown word, and the processing proceeds to Step S1612 when $W_k$ is an unknown word, or otherwise the processing proceeds to Step S1624.

In Step S1612, the character number restriction module 1510 determines whether or not the number of characters included in $W_k$ is equal to or less than a predetermined number of characters, and the processing proceeds to Step S1614 when the number of characters included in $W_k$ is equal to or less than the predetermined number of characters, or otherwise the processing proceeds to Step S1624.

In Step S1614, the incorrect word detecting module 1530 outputs $W_k$ as an incorrect word to the incorrect character sequence output module 140.

In Step S1616, the incorrect word detecting module 1530 determines whether or not k−s≤N is satisfied, and the processing proceeds to Step S1618 when k−s≤N, or otherwise the processing proceeds to Step S1626.

In Step S1618, the incorrect word detecting module 1530 determines whether or not k==s is satisfied, and the processing proceeds to Step S1626 when k==s, or otherwise the processing proceeds to Step S1620.

In Step S1620, the incorrect word detecting module 1530 outputs $W_s$ as an incorrect word to the incorrect character sequence output module 140.

In Step S1622, the incorrect word detecting module 1530 substitutes s+1 into the variable s and performs the processing from Step S1618.

In Step S1624, the word sorting module 120 substitutes k+1 into the variable k. Then, the processing returns to Step S1608.

In Step S1626, the word sorting module 120 substitutes k+1 into the variable s. Then, the processing proceeds to Step S1624.

In Step S1628, the incorrect character sequence output module 140 outputs an incorrect character sequence.

Figure 17:
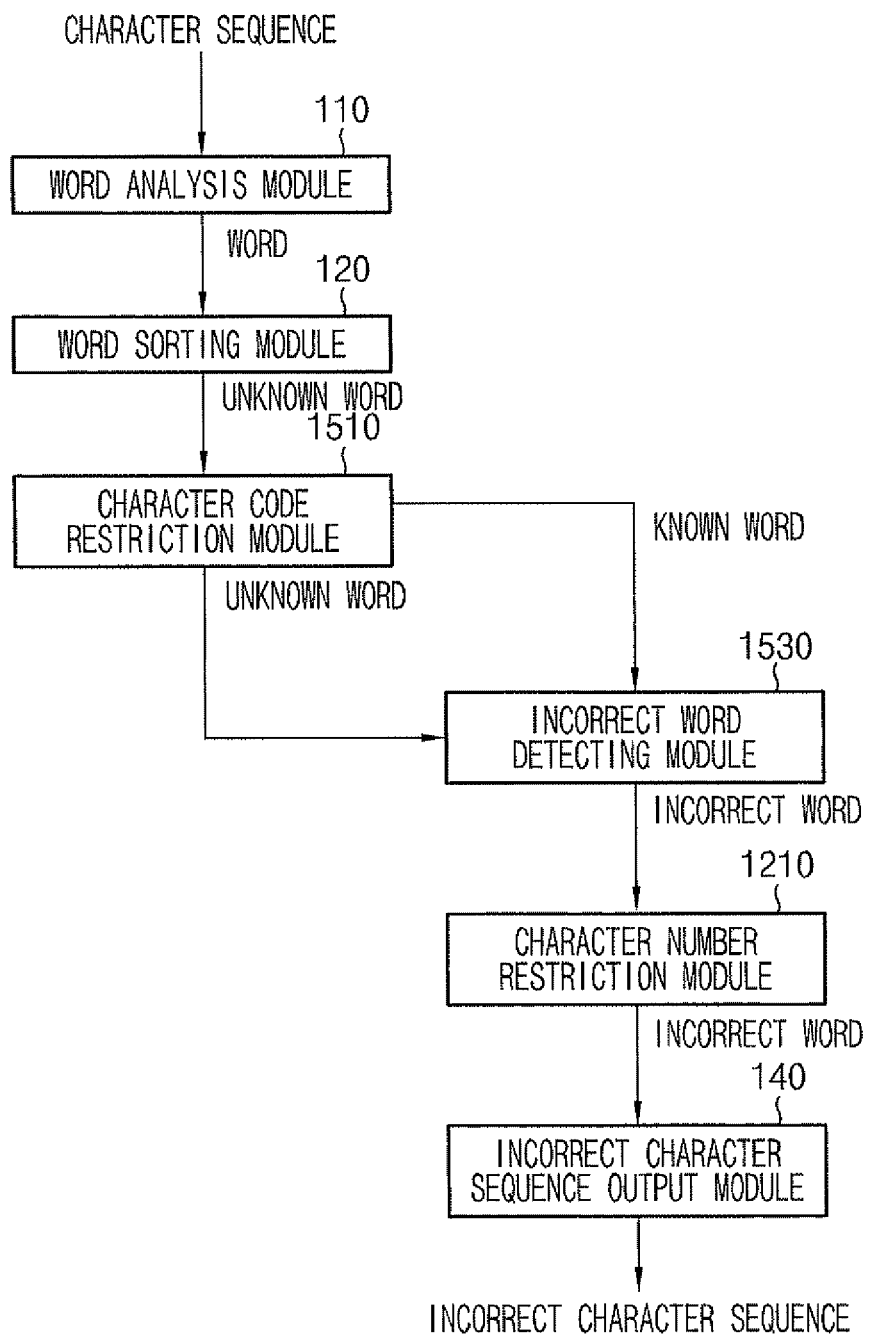
FIG. 17 is a conceptual module configuration diagram of a configuration example according to a seventh exemplary embodiment.

FIG. 17 is a conceptual module configuration diagram of a configuration example according to a seventh exemplary embodiment. An exemplary embodiment of performing character number restriction in error detection for character sequences will be described. The seventh exemplary embodiment is the combination of the fifth exemplary embodiment and the sixth exemplary embodiment.

According to the seventh exemplary embodiment, the word analysis module 110, the word sorting module 120, the character number restriction module 1510, the incorrect word detecting module 1530, the character number restriction module 1210, and the incorrect character sequence output module 140 are provided.

The incorrect word detecting module 1530 is connected to the word sorting module 120, the character number restriction module 1510, and the character number restriction module 1210, detects character sequences sorted as unknown words by the character number restriction module 1510 as incorrect words, and detects a ninth character sequence between a seventh character sequence and an eighth character sequence, which have been sorted as unknown words by the character number restriction module 1510, as incorrect words when the ninth sequence includes words determined to be known words by the word sorting module 120 and the number of the known words is less than or equal to or less than a predetermined number. Then, the detected incorrect words are output to the character number restriction module 1210.

The character number restriction module 1210 is connected to the incorrect word detecting module 1530 and the incorrect character sequence output module 140 and determines whether or not the ninth character sequence detected as an incorrect word by the incorrect word detecting module 1530 is an incorrect word depending on whether or not the length of the ninth character sequence is less than or equal to or less than a predetermined length. That is, when the length of the ninth character sequence detected as an incorrect word by the incorrect word detecting module 1530 is less than or equal to or less than the predetermined length, the ninth character sequence is detected as an incorrect word. In the above example, when the ninth character sequence is interposed between unknown words and includes N or a smaller number of known words, and the entire length of the known words interposed between the unknown words (that is, the sum of the lengths of character sequences of the known words interposed between the unknown words) is less than or equal to or less than the predetermined length, the ninth character sequence is detected as an incorrect word. Then, the incorrect word is output to the incorrect character sequence output module 140.

The incorrect character sequence output module 140 is connected to the character number restriction module 1210, receives incorrect words from the character number restriction module 1210, creates incorrect character sequences from the incorrect words, and outputs the created incorrect character sequence.

Figure 18:
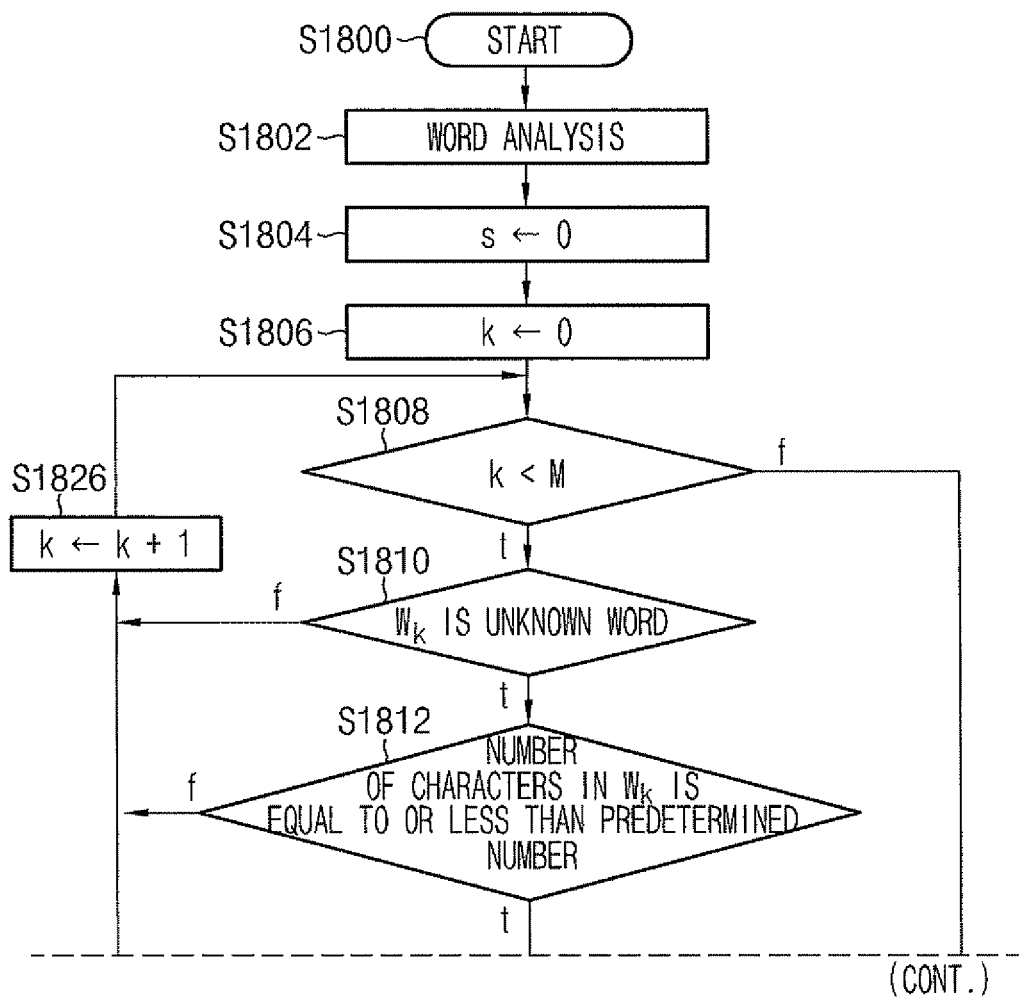
FIG. 18 is a flowchart showing an example of processing according to the seventh exemplary embodiment.

FIG. 18 is a flowchart showing an example of processing according to the seventh exemplary embodiment.

In Step S1802, the word analysis module 110 performs the word analysis.

In Step S1804, the word sorting module 120 substitutes 0 into the variable s.

In Step S1806, the word sorting module 120 substitutes 0 into the variable k.

In Step S1808, the word sorting module 120 determines whether or not k<M is satisfied, and the processing proceeds to Step S1810 when k<M, or otherwise the processing proceeds to Step S1830.

In Step S1810, the word sorting module 120 determines whether or not $W_k$ is an unknown word, and the processing proceeds to Step S1812 when $W_k$ is an unknown word, or otherwise the processing proceeds to Step S1826.

In Step S1812, the character number restriction module 1510 determines whether or not the number of characters included in $W_k$ is equal to or less than a predetermined number of characters, and the processing proceeds to Step S1814 when the number of characters included in $W_k$ is equal to or less than the predetermined number of characters, or otherwise the processing proceeds to Step S1826.

In Step S1814, the incorrect word detecting module 1530 outputs $W_k$ as an incorrect word to the character number restriction module 1210. Alternatively, the incorrect word detecting module 1530 may output $W_k$ to the incorrect character sequence output module 140.

In Step S1816, the incorrect word detecting module 1530 determines whether or not k−s≤N is satisfied, and the processing proceeds to Step S1818 when k−s≤N, or otherwise the processing proceeds to Step S1828.

In Step S1818, the character number restriction module 1210 determines whether or not the total character sequence length from $W_s$ to $W_{k-1}$ (the character sequence length in the case of coupling the character sequences from $W_s$ to $W_{k-1}$) is equal to or less than a predetermined number of characters, and the processing proceeds to Step S1820 when the character sequence length is equal to or less than the predetermined number of characters, or otherwise the processing proceeds to Step S1828.

In Step S1820, the character number restriction module 1210 determines whether or not k==s is satisfied, and the processing proceeds to Step S1828 when k==s, or otherwise the processing proceeds to Step S1822.

In Step S1822, the character number restriction module 1210 outputs $W_s$ as an incorrect word to the incorrect character sequence output module 140.

In Step S1824, the character number restriction module 1210 substitutes s+1 into the variable s and performs the processing from Step S1820.

In Step S1826, the word sorting module 120 substitutes k+1 into the variable k. Then, the processing returns to Step S1808.

In Step S1828, the word sorting module 120 substitutes k+1 into the variable s. Then, the processing proceeds to Step S1826.

In Step S1830, the incorrect character sequence output module 140 outputs incorrect character sequences.

Figure 19:
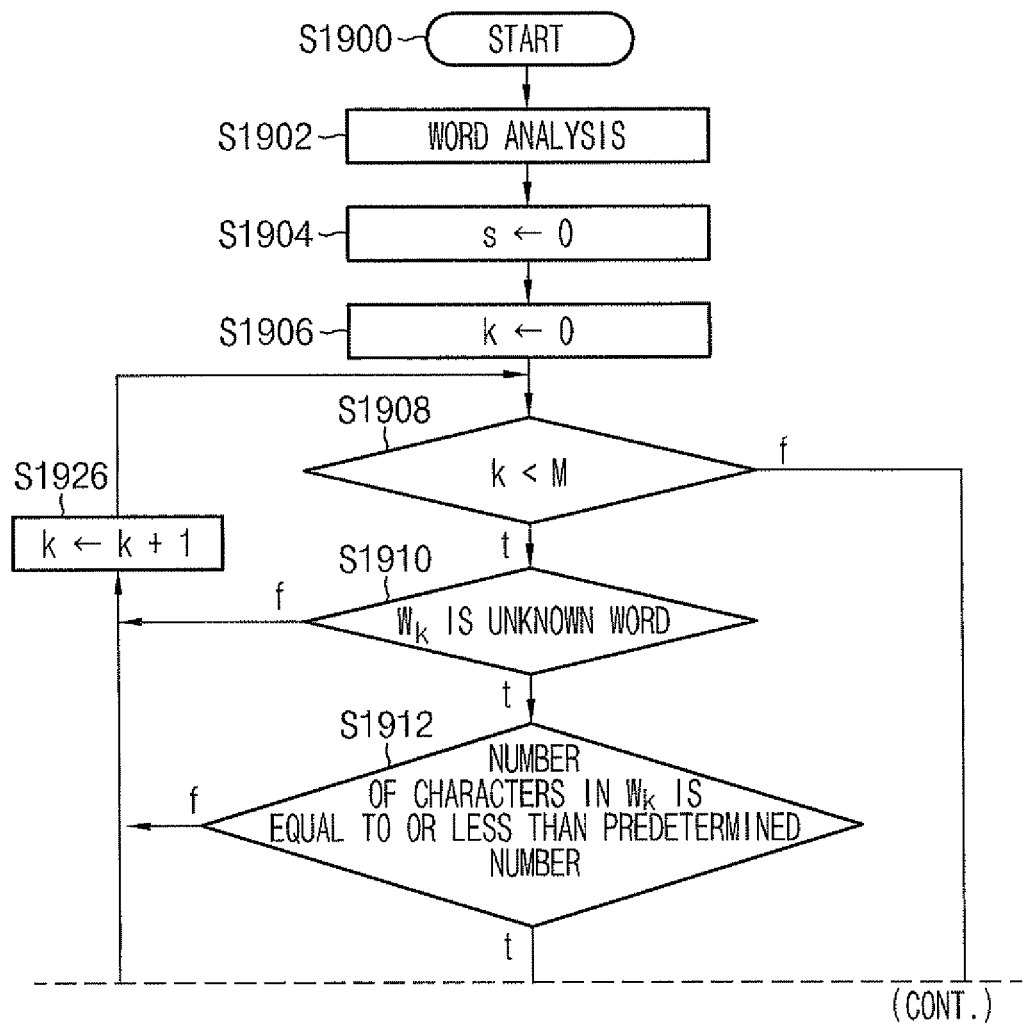
FIG. 19 is a flowchart showing another example of processing according to the seventh exemplary embodiment.

FIG. 19 is a flowchart showing another example of processing according to the seventh exemplary embodiment.

In Step S1902, the word analysis module 110 performs the word analysis.

In Step S1904, the word sorting module 120 substitutes 0 into the variable s.

In Step S1906, the word sorting module 120 substitutes 0 into the variable k.

In Step S1908, the word sorting module 120 determines whether or not k<M is satisfied, and the processing proceeds to Step S1910 when k<M, or otherwise the processing proceeds to Step S1930.

In Step S1910, the word sorting module 120 determines whether or not $W_k$ is an unknown word, and the processing proceeds to Step S1912 when $W_k$ is an unknown word, or otherwise the processing proceeds to Step S1926.

In Step S1912, the character number restriction module 1510 determines whether or not the number of characters included in $W_k$ is equal to or less than a predetermined number of characters, and the processing proceeds to Step S1914 when the number of characters included in $W_k$ is equal to or less than the predetermined number of characters, or otherwise the processing proceeds to Step S1926.

In Step S1914, the incorrect word detecting module 1530 outputs $W_k$ as an incorrect word to the character number restriction module 1210. Alternatively, the incorrect word detecting module 1530 may output $W_k$ to the incorrect character sequence output module 140.

In Step S1916, the incorrect word detecting module 1530 determines whether or not k−s≤N, and the processing proceeds to Step S1918 when k−s≤N, or otherwise the processing proceeds to Step S1928.

In Step S1918, the character number restriction module 1210 determines whether or not k==s is satisfied, and the processing proceeds to Step S1928 when k==s, or otherwise the processing proceeds to Step S1920.

In Step S1920, the character number restriction module 1210 determines whether or not the character sequence length of $W_s$ (the individual character sequence length) is equal to or less than a predetermined number of characters, and the processing proceeds to Step S1922 when the character sequence length of $W_s$ is equal to or less than the predetermined number of characters, or otherwise the processing proceeds to Step S1924.

In Step S1922, the character number restriction module 1210 outputs $W_s$ as an incorrect word to the incorrect character sequence output module 140.

In Step S1924, the character number restriction module 1210 substitutes s+1 into the variable s and performs the processing from Step S1918.

In Step S1926, the word sorting module 120 substitutes k+1 into the variable k. Then, the processing returns to Step S1908.

In Step S1928, the word sorting module 120 substitutes k+1 into the variable s. Then, the processing proceeds to Step S1926.

In Step S1930, the incorrect character sequence output module 140 outputs incorrect character sequences.

In addition, the second to fourth exemplary embodiments and the fifth to seventh exemplary embodiments may be combined. With such combinations, exemplary embodiments of performing both the character code restriction and the character number restriction in the error detection for character sequences may be obtained.

Figure 20:
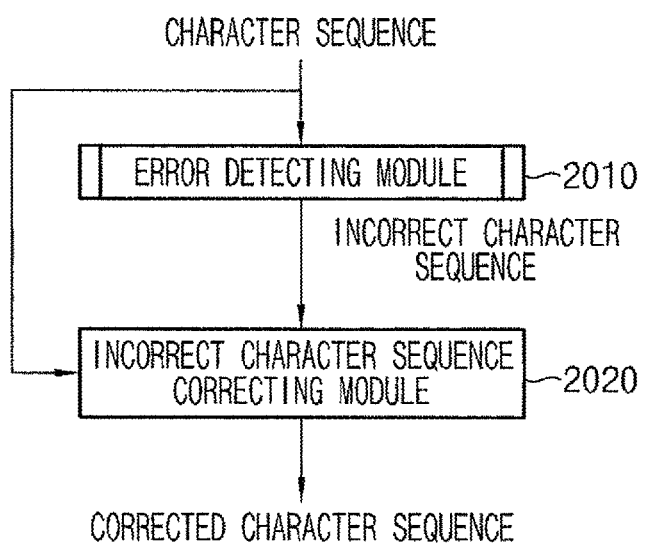
FIG. 20 is a conceptual module configuration diagram of a configuration example according to an eighth exemplary embodiment.

FIG. 20 is a conceptual module configuration diagram of a configuration example according to an eighth exemplary embodiment.

According to the eighth exemplary embodiment, error correction is performed, and an error detecting module 2010 and an incorrect character sequence correcting module 2020 are provided. The error correction is performed on the incorrect character sequences detected according to the aforementioned exemplary embodiments (including the combinations between the second to fourth exemplary embodiments and the fifth to seventh exemplary embodiments).

The error detecting module 2010 is connected to the incorrect character sequence correcting module 2020, receives character sequences, extracts incorrect character sequences from among the received character sequences, and passes the extracted incorrect character sequences to the incorrect character sequence correcting module 2020. Specifically, the aforementioned exemplary embodiments correspond thereto.

The incorrect character sequence correcting module 2020 is connected to the error detecting module 2010, receives the incorrect character sequences from the error detecting module 2010, corrects the incorrect character sequences, combines the corrected character sequences with the original character sequences (which is the character sequences other than the incorrect character sequences from among the character sequences received by the error detecting module 2010), and outputs the corrected character sequences.

Figure 21:
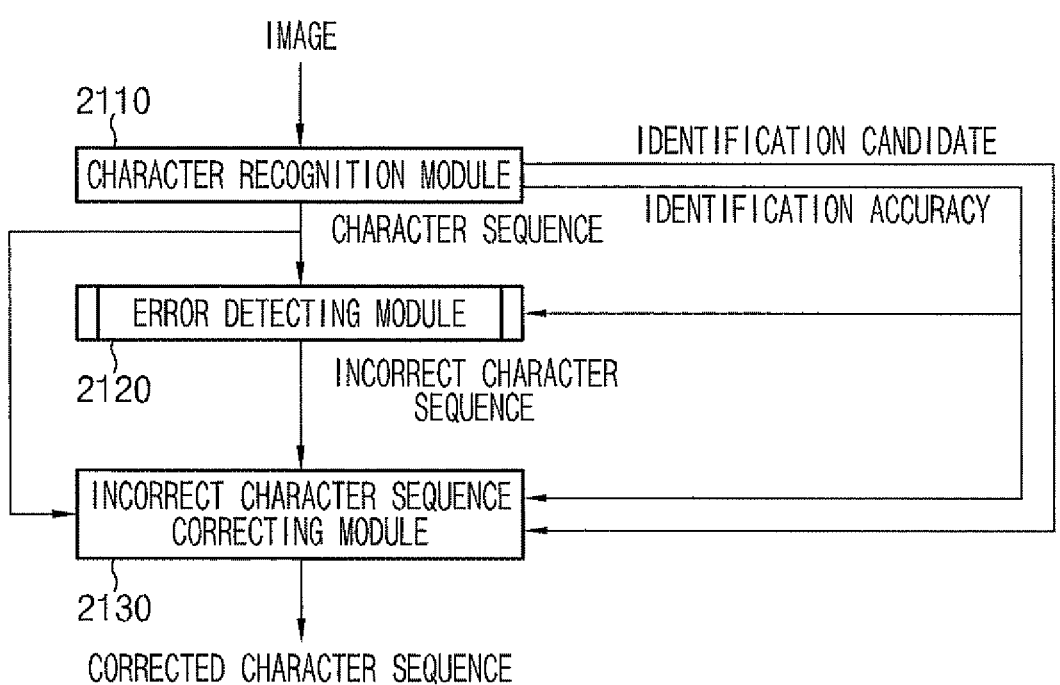
FIG. 21 is a conceptual module configuration diagram of a configuration example according to a ninth exemplary embodiment.

FIG. 21 is a conceptual module configuration diagram of a configuration example according to a ninth exemplary embodiment.

According to the ninth exemplary embodiment, error correction of a character recognition result is performed, and a character recognition module 2110, an error detecting module 2120, and an incorrect character sequence correcting module 2130 are provided.

The character recognition module 2110 receives an image, recognizes characters in the image, passes character sequences as a result of the character recognition to the error detecting module 2120 and the incorrect character sequence correcting module 2130, passes the identification accuracy to the error detecting module 2120 and the incorrect character sequence correcting module 2130, and passes identification candidates to the incorrect character sequence correcting module 2130.

As a result of the character recognition, identification accuracy and identification candidates for each character in each character recognition result are obtained as well as character codes. Here, the identification accuracy is the likeliness of a character code as a result of character recognition and is a numerical value which represents that there is a high possibility of an identification error when the value is small. In addition, the identification candidates are a set (group) of character codes with high identification accuracy as well as the character codes as a result of the character identification.

The error detecting module 2120 is connected to the character recognition module 2110 and the incorrect character sequence correcting module 2130, receives the character sequences and the identification accuracy from the character recognition module 2110, extracts incorrect character sequences from among the character sequences, and passes the extracted incorrect character sequences to the incorrect character sequence correcting module 2130. Specifically, the aforementioned first to seventh exemplary embodiments (including the combination between the second to fourth exemplary embodiments and the fifth to seventh exemplary embodiments) correspond thereto.

In addition, the identification accuracy is used by the error detecting module 2120. A configuration is further applicable in which known words interposed between unknown words are output as incorrect words when the total value of the identification accuracy for each character included in the known words is less than or equal to or less than a predetermined value in the aforementioned first to seventh exemplary embodiments. Here, the total value of the identification accuracy includes a maximum value, a minimum value, a center value, a mode value, an average value, or the like. In addition, a configuration is also applicable in which known words interposed between unknown words are output as incorrect words when a variance value of the identification accuracy of each character in the known words is greater than or equal to or greater than the predetermined value.

The incorrect character sequence correcting module 2130 is connected to the character recognition module 2110 and the error detecting module 2120, receives character sequences, identification accuracy, and identification candidates from the character recognition module 2110, and receives incorrect character sequences from the error detecting module 2120. Then, the incorrect character sequence correcting module 2130 corrects the incorrect character sequences, combines the corrected character sequences with the original character sequences (which is the character sequences other than the incorrect character sequences from among the character sequences as a result of the character recognition by the error detecting module 2120), and outputs the corrected character sequences.

In addition, the identification candidates are used by the incorrect character sequence correcting module 2130. The incorrect character sequences as correction candidates are created from the identification candidates, and some incorrect character sequences are selected and output from among the multiple created correction candidates. In the selection of the correction candidates, incorrect character sequences with large total values of identification accuracy of each character constituting the correction candidates may be selected with priority.

Figure 22:
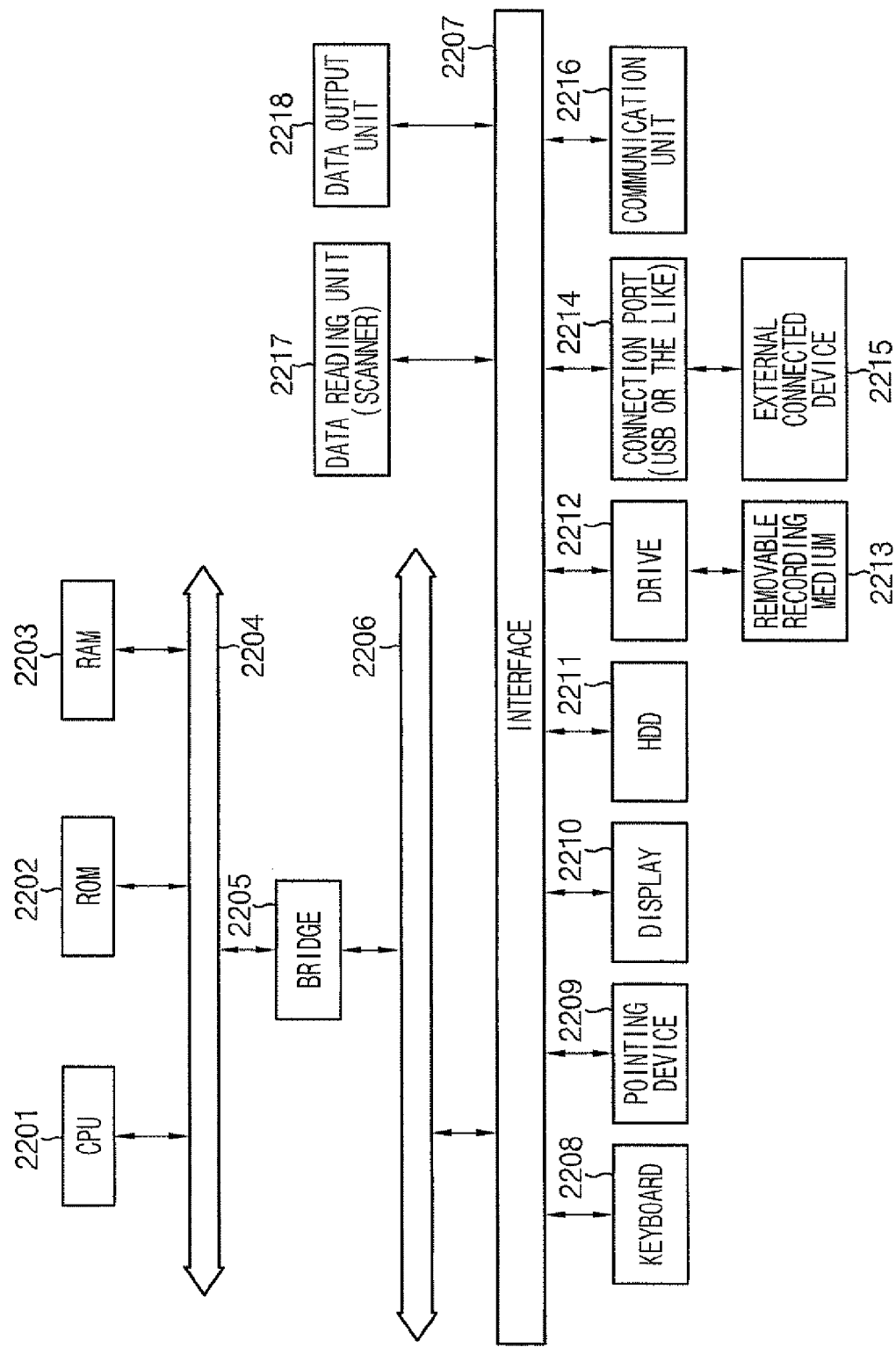
FIG. 22 is a block diagram showing a hardware configuration example for a computer which realizes an exemplary embodiment.

Referring to FIG. 22, description will be given of a hardware configuration example of an information processing apparatus according to this exemplary embodiment. The configuration shown in FIG. 22 is configured by a personal computer (PC) or the like, for example, and the hardware configuration example provided with a data reading unit 2217 such as a scanner or the like and a data output unit 2218 such as a printer or the like is shown.

A CPU (Central Processing Unit) 2201 is a control unit which executes the processing based on a computer program including description of execution sequences of the various modules described above in the exemplary embodiments, namely the word analysis module 110, the word sorting module 120, the incorrect word detecting module 130, the incorrect character sequence output module 140, the character code restriction module 610, the incorrect word detecting module 630, the character code restriction module 810, the character number restriction module 1210, the character number restriction module 1510, the incorrect word detecting module 1530, the error detecting module 2010, the incorrect character sequence correcting module 2020, the character recognition module 2110, the error detecting module 2120, the incorrect character sequence correcting module 2130, and the like.

A ROM (Read Only Memory) 2202 stores programs, computation parameters, and the like used by the CPU 2201. A RAM (Random Access Memory) 2203 stores programs used in the execution by the CPU 2201, parameters which appropriately change in the execution, and the like. Such components are mutually connected via a host bus 2204 configured by a CPU bus or the like.

The host bus 2204 is connected to an external bus 2206 such as a PCI (Peripheral Component Interconnect/Interface) bus or the like via a bridge 2205.

A pointing device 2209 such as a keyboard 2208, a mouse, or the like is an input device operated by an operator. Examples of a display 2210 include a liquid crystal display apparatus, a CRT (Cathode Ray Tube), and the like, and the display 2210 displays various information items as text information or image information.

An HDD (Hard Disk Drive) 2211 incorporates a hard disk and drives the hard disk to record or reproduce a program executed by the CPU 2201 or information. The hard disk stores received character sequences, created incorrect character sequences, dictionaries, and the like. Furthermore, other various computer programs such as various data processing programs are stored therein.

A drive 2212 reads data or programs recorded in a mounted removable recording medium 2213 such as a magnetic disc, an optical disc, a magneto-optical disc, a semiconductor memory, or the like and supplies the data or the programs to the RAM 2203 connected via the interface 2207, the external bus 2206, the bridge 2205, and the host bus 2204. The removable recording medium 2213 may also be used as the same data recording region as the hard disk.

A connection port 2214 is a port to connect the external connected device 2215 and includes a connection unit such as a USB, an IEEE 1394, or the like. The connection port 2214 is connected to the CPU 2201 and the like via the interface 2207, the external bus 2206, the bridge 2205, the host bus 2204, and the like. A communication unit 2216 is connected to a network to execute data communication processing with the external devices. A data reading unit 2217 is a scanner, for example, to execute document reading processing. A data output unit 2218 is a printer, for example, to execute document data output processing.

In addition, the hardware configuration of the information processing apparatus shown in FIG. 22 is one configuration example, the exemplary embodiments are not limited to the configuration shown in FIG. 22, and any configuration with which it is possible to execute the modules described in the exemplary embodiments is applicable. For example, a part of the modules may be configured by dedicated hardware (for example, an Application Specific Integrated Circuit (ASIC) or the like), a configuration is also applicable in which a part of the modules are in an external system which is connected via a communication line, or multiple systems shown in FIG. 22 are connected to each other via communication lines such that the systems cooperate with each other. In addition, the modules may be built in a copy machine, a facsimile machine, a scanner, a printer, or a complex machine (an image processing apparatus with two or more functions of a scanner, a printer, a copy machine, a facsimile machine, and the like).

In addition, the aforementioned various exemplary embodiments may be combined (including a case in which a module in a certain exemplary embodiment is added to another exemplary embodiment, a case in which a module in a certain exemplary embodiment is replaced with a module in another exemplary embodiment, and the like, for example).

In addition, although the aforementioned exemplary embodiments are described with Japanese character sequences regarded as targets, character sequences in another language (Chinese, Korean, English, or the like) may be targets.

Moreover, the program described above may be stored and provided in a recording medium, or the program may be provided via communication. In such a case, the program described above may be understood as an invention of "a computer-readable recording medium that records the program".

The "computer-readable recording medium that records the program" means a computer readable recording medium that records the program, which is used for installing, executing, and distributing the program.

In addition, examples of the recording medium include "a DVD-R, a DVD-RW, a DVD-RAM, or the like" which are standards defined by the DVD forum, "a DVD+R, a DVD+RW, or the like" which are standards defined by DVD+RW, all of which are digital versatile discs (DVD), a read only memory (CD-ROM), a CD recordable (CD-R), a CD rewritable (CD-RW), or the like, all of which are compact discs (CD), a Blu-ray Disc (registered trademark), a magneto-optical disc (MO), a flexible disk (FD), a magnetic tape, a hard disk, a read only memory (ROM), an Electrically Erasable Programmable Read-Only Memory (EEPROM (registered trademark)), a flash memory, a random access memory (RAM), an SD (Secure Digital) memory card, and the like.

In addition, the program or apart thereof may be recorded in such a recording medium and stored and distributed. Moreover, the program may be delivered via communication using a local area network (LAN), a metropolitan area network (MAN), a wide area network (WAN), a wired network used for the Internet, an intranet, an extranet, or the like, a wireless communication network, or a delivery medium of the combination thereof, or transported via a carrier wave.

Furthermore, the program may be a part of another program or may be recorded in a recording medium with another program. In addition, the program may be divided and recorded in multiple recording media. Moreover, the program may be recorded in any recoverable state including a compressed state or a coded state.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a processor configured to act as:
   a receiving unit that receives character sequences;
   a sorting unit that identifies known words and unknown words in the character sequences; and
   a detecting unit that detects incorrect words from among a set of words identified by the sorting unit as unknown words, and that classifies a third character sequence, which is between a first character sequence and a second character sequence, as incorrect words when (1) the third character sequence includes words that the sorting unit identified as known words, and (2) there are a predetermined number of, or less than the predetermined number of, words that the sorting unit identified as known words and that are included in the third character sequence, wherein the first character sequence and the second character sequence are identified as unknown words by the sorting unit.

2. The information processing apparatus according to claim 1, the processor further configured to act as:
   a first determination unit that determines whether or not each of the identified unknown words is unknown, based on whether or not character codes of characters in the character sequences satisfy a predetermined rule relating to character codes,
   wherein the detecting unit detects incorrect words from among a set of words identified by the first determination unit as unknown words, and that classifies a sixth character sequence, which is between a fourth character sequence and a fifth character sequence, as incorrect words when (1) the sixth character sequence includes words that the sorting unit identified as known words, and (2) there are a predetermined number of, or less than the predetermined number of, words that the sorting unit identified as known words and that are included in the sixth character sequence, wherein the fourth character sequence and the fifth character sequence are identified as unknown words by the first determination unit.

3. The information processing apparatus according to claim 1, the processor further configured to act as:
   a first determination unit that determines whether or not each of the detected incorrect words are incorrect, based on whether or not character codes of characters in the classified character sequence satisfy a predetermined rule relating to character codes.

4. The information processing apparatus according to claim 2, the processor further configured to act as:
   a second determination unit that determines whether or not each of the detected incorrect words are incorrect, based on whether or not character codes of characters in the classified character sequence satisfy a predetermined rule relating to character codes.

5. The information processing apparatus according to claim 1, the processor further configured to act as:
   a first determination unit that determines whether or not the third character sequence is an incorrect word, depending on whether or not a length of the third character sequence is less than or equal to a predetermined length.

6. The information processing apparatus according to claim 2, the processor further configured to act as:
   a second determination unit that determines whether or not the third character sequence is an incorrect word, depending on whether or not a length of the third character sequence is less than or equal to a predetermined length.

7. The information processing apparatus according to claim 3, the processor further configured to act as:
   a second determination unit that determines whether or not the third character sequence is an incorrect word, depending on whether or not a length of the third character sequence is less than or equal to a predetermined length.

8. The information processing apparatus according to claim 4, the processor further configured to act as:
   a third determination unit that determines whether or not the third character sequence is an incorrect word, depending on whether or not a length of the third character sequence is less than or equal to a predetermined length.

9. The information processing apparatus according to claim 1, the processor further configured to act as:
   a first determination unit that determines whether or not a character sequence is an unknown word, depending on whether or not a length of the character sequence is less than or equal to a predetermined length,
   wherein the detecting unit detects incorrect words from among a set of words identified by the first determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the first determination unit.

10. The information processing apparatus according to claim 2, the processor further configured to act as:
    a second determination unit that determines whether or not a character sequence is an unknown word, depending on whether or not a length of the character sequence is less than or equal to a predetermined length,
    wherein the detecting unit detects incorrect words from among a set of words identified by the second determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the second determination unit.

11. The information processing apparatus according to claim 3, the processor further configured to act as:
    a second determination unit that determines whether or not a character sequence is an unknown word, depending on whether or not a length of the character sequence is less than or equal to a predetermined length,
    wherein the detecting unit detects incorrect words from among a set of words identified by the second determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the second determination unit.

12. The information processing apparatus according to claim 4, the processor further configured to act as:
    a third determination unit that determines whether or not a character sequence is an unknown word, depending on whether or not a length of the character sequence is less than or equal to a predetermined length,
    wherein the detecting unit detects incorrect words from among a set of words identified by the third determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the third determination unit.

13. The information processing apparatus according to claim 5, the processor further configured to act as:
    a second determination unit that determines whether or not a character sequence is an unknown word, depending on whether or not a length of the character sequence is less than or equal to a predetermined length,
    wherein the detecting unit detects incorrect words from among a set of words identified by the second determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the second determination unit.

14. The information processing apparatus according to claim 6, the processor further configured to act as:
    a third determination unit that determines whether or not a character sequence is an unknown word, depending on whether or not a length of the character sequence is less than or equal to predetermined length,
    wherein the detecting unit detects incorrect words from among a set of words identified by the third determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the third determination unit.

15. The information processing apparatus according to claim 7, the processor further configured to act as:
    a third determination unit that determines whether or not a character sequence is an unknown word, depending on whether or not a length of the character sequence is less than or equal to a predetermined length,
    wherein the detecting unit detects incorrect words from among a set of words identified by the third determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the third determination unit.

16. The information processing apparatus according to claim 8, the processor further configured to act as:
    a fourth determination unit that determines whether or not a character sequence is an unknown word, depending on whether or not a length of the character sequence is less than or equal to a predetermined length,
    wherein the detecting unit detects incorrect words from among a set of words identified by the fourth determination unit as unknown words, and that classifies a ninth character sequence, which is between a seventh character sequence and an eighth character sequence, as incorrect words when (1) the ninth character sequence includes words that the sorting unit identified as known words, and (2) there are a predetermined number of, or less than the predetermined number of, words that the sorting unit identified as known words and that are included in the ninth character sequence, wherein the seventh character sequence and the eighth character sequence are identified as unknown words by the fourth determination unit.

17. A non-transitory computer readable medium storing an information processing program causing a computer to execute functions as:
    a receiving unit that receives character sequences;
    a sorting unit that identifies known words and unknown words in the character sequences; and
    a detecting unit that detects incorrect words from among a set of words identified by the sorting unit as unknown words, and that classifies a third character sequence, which is between a first character sequence and a second character sequence, as incorrect words when (1) the third character sequence includes words that the sorting unit identified as known words, and (2) there are a predetermined number of, or less than the predetermined number of, words that the sorting unit identified as known words and that are included in the third character sequence, wherein the first character sequence and the second character sequence are identified as unknown words by the sorting unit.

18. An information processing method comprising:
    using at least one processor to perform the steps of:
    receiving character sequences from an input device;
    identifying known words and unknown words in the character sequences; and detecting incorrect words from among a set of words identified as unknown words, and classifying a third character sequence, which is between a first character sequence and a second character sequence, as incorrect words when (1) the third character sequence includes words identified as known words, and (2) there are a predetermined number of, or less than the predetermined number of, words identified as known words and that are included in the third character sequence, wherein the first character sequence and the second character sequence are identified as unknown words.

* * * * *